United States Patent
Atwater et al.

(10) Patent No.: US 11,258,062 B2
(45) Date of Patent: Feb. 22, 2022

(54) GROUP VIII PERIOD 4 ELEMENT (FE, CO, NI) METAL SITE AND CL "O" SITE MODIFIED LITHIUM MANGANESE BASED CATHODE MATERIAL, METHOD OF PREPARING THE SAME, AND LI ELECTROCHEMICAL CELL CONTAINING THE SAME

(71) Applicant: United States Government, as represented by the Secretary of the Army, Aberdeen Proving Ground, MD (US)

(72) Inventors: Terrill B. Atwater, Bel Air, MD (US); Matthew A. Limpert, Kennett Square, PA (US); Ashley L. Ruth, Bel Air, MD (US); Paula C. Latorre, Bel Air, MD (US)

(73) Assignee: The Government of the United States, as represented by the Secretary of the Army, Washington, DC (US)

( * ) Notice: Subject to any disclaimer, the term of this patent is extended or adjusted under 35 U.S.C. 154(b) by 161 days.

(21) Appl. No.: 16/527,855

(22) Filed: Jul. 31, 2019

(65) Prior Publication Data

US 2021/0036316 A1 Feb. 4, 2021

(51) Int. Cl.
  *H01M 4/505* (2010.01)
  *H01M 10/0525* (2010.01)
  (Continued)

(52) U.S. Cl.
  CPC .......... *H01M 4/505* (2013.01); *C01G 53/006* (2013.01); *H01M 4/525* (2013.01);
  (Continued)

(58) Field of Classification Search
  CPC .. H01M 4/505; H01M 4/525; H01M 10/0525; C01G 53/006
  (Continued)

(56) References Cited

U.S. PATENT DOCUMENTS 8,597,377 B1   12/2013   Atwater et al.
8,900,752 B2   12/2014   Atwater et al.
(Continued)

FOREIGN PATENT DOCUMENTS

CN  102723472 A  * 10/2012
CN  108091863 A  *  5/2018
JP   10177859 A  *  6/1998

OTHER PUBLICATIONS

Lee et al., Preparation of Nano-Crystalline $LiFe_{0.97}Co_{0.03}O_{1.95}Cl_{0.05}$ by Solid-State Method, 2002, Chemistry Letters, 6, 642-643 (Year: 2002).*

(Continued)

*Primary Examiner* — Sean P Cullen
(74) *Attorney, Agent, or Firm* — Kirsten Hiera

(57) ABSTRACT

A process for preparing a cathode material of the form $Li_aMn_{1-x-y-z}Fe_xCo_yNi_zO_{2-d}Cl_d$ is provided. In addition, a $Li_aMn_{1-x-y-z}Fe_xCo_yNi_zO_{2-d}Cl_d$ cathode material for electrochemical systems is provided. Furthermore, a lithium or lithium-ion rechargeable electrochemical cell is provided, incorporating the $Li_aMn_{1-x-y-z}Fe_xCo_yNi_zO_{2-d}Cl_d$ cathode material in a positive electrode.

20 Claims, 28 Drawing Sheets

(51) Int. Cl.
*H01M 4/525* (2010.01)
*C01G 53/00* (2006.01)
*H01M 4/02* (2006.01)

(52) U.S. Cl.
CPC ..... *H01M 10/0525* (2013.01); *C01P 2002/50* (2013.01); *C01P 2002/72* (2013.01); *C01P 2002/85* (2013.01); *C01P 2006/40* (2013.01); *H01M 2004/028* (2013.01)

(58) Field of Classification Search
USPC .................................. 429/221, 231.1, 231.3
See application file for complete search history.

(56) References Cited

U.S. PATENT DOCUMENTS

| | | | |
|---|---|---|---|
| 8,900,756 | B1 | 12/2014 | Atwater et al. |
| 9,979,011 | B2 | 5/2018 | Atwater et al. |
| 10,505,188 | B2 | 12/2019 | Atwater et al. |
| 10,516,156 | B2 | 12/2019 | Ruth et al. |
| 2013/0101898 | A1 | 4/2013 | Atwater et al. |
| 2016/0043419 | A1 | 2/2016 | Thampan et al. |
| 2016/0043420 | A1 | 2/2016 | Thampan et al. |
| 2016/0093876 | A1 | 3/2016 | Atwater et al. |
| 2016/0260968 | A1 | 9/2016 | Atwater et al. |
| 2017/0346074 | A1 | 11/2017 | Atwater et al. |
| 2018/0138496 | A1* | 5/2018 | Ikeuchi .................. C01G 51/42 |
| 2019/0100442 | A1 | 4/2019 | Atwater et al. |

OTHER PUBLICATIONS

Ruth, Latorre, Wachsman, and Atwater, Electrochemical Performance of $LixMn_2-yFeyO_4-zCl_z$ Synthesized through in Situ Glycine Nitrate Combustion, ECS Transactions, 2017, pp. 305-316, vol. 80, issue 10, The Electrochemical Society, USA.

Ruth, Latorre, Wachsman, and Atwater, Cycle Life Performance of $LixMn_2-yFeyO_4-zCl_z$ Made via in Situ Combustion Synthesis, ECS Transactions, 2017, pp. 125-133, vol. 80, issue 10, The Electrochemical Society, USA.

Atwater and Tavares, Halogenated Lithium Manganese Oxide $AB_2O_4-dX_d$ Spinel Cathode Material, SAE International Journal of Materials and Manufacturing, Jan. 2013, (5 pages), vol. 6, Issue 1, SAE International, USA.

* cited by examiner

US 11,258,062 B2

GROUP VIII PERIOD 4 ELEMENT (FE, CO, NI) METAL SITE AND CL "O" SITE MODIFIED LITHIUM MANGANESE BASED CATHODE MATERIAL, METHOD OF PREPARING THE SAME, AND LI ELECTROCHEMICAL CELL CONTAINING THE SAME

GOVERNMENT INTEREST

The invention described herein may be manufactured, used, imported, sold, and licensed by or for the Government of the United States of America without the payment of any royalty thereon or therefor.

FIELD OF THE INVENTION

The present disclosure relates generally to the field of electrochemical power sources and, more particularly, to rechargeable lithium and lithium-ion batteries using manganese-based materials as a positive electrode.

BACKGROUND OF THE INVENTION

Perhaps the most popular battery chemistries that have hit the consumer market recently are lithium-based systems. Lithium batteries use high valence metal oxide materials, which are reduced during the electrochemical reaction. This reaction in rechargeable lithium and rechargeable lithium ion batteries must be fully reversible in order to have a commercially viable cell. These electrochemical systems include manganese-based lithium metal oxides configured in lithium, lithium ion, and lithium polymer electrochemical cells. Common reversible metal oxide materials used in lithium batteries include $Li_xMn_2O_4$, $Li_xMnO_2$, $Li_xCoO_2$, $Li_xNiO_2$, and $Li_xNi_yCo_zO_2$.

Today, rechargeable lithium batteries are used in portable electronic devices including cellular phones and laptop computers. Future use of rechargeable lithium battery systems is targeted at applications related to electronic vehicles and pairing with fuel cells to produce high-energy systems with excellent pulse capabilities. Lithium batteries have the flexibility of being packaged into either cylindrical or prismatic cell designs; this feature makes them applicable to almost any portable electronic system where battery volume is a concern.

The benefits of lithium battery systems include high specific energy (Wh/kg) and high energy density (Wh/l). Lithium electrochemical systems produce a relatively high nominal voltage between 3.0 V and 4.75 V. Lithium electrochemical systems can operate between 3.0 V and 4.35 V or between 2.0 and 3.5 V. Additionally, lithium electrochemical systems have excellent charge retention due to a low self-discharge rate.

Manganese dioxide ($MnO_2$) based materials are attractive for use as a cathode material in lithium electrochemical systems. $MnO_2$ is attractive because of its high energy density and low material cost. $MnO_2$ is an active material which creates a skeletal structure that allows lithium cations to fill vacancies and voids within the structure. Ideally, this structure does not change with cycling; altering of this crystal structure may cause capacity fading. Additionally, the $MnO_2$ active material exists in different forms. These forms include a lithiated spinel ($Li_xMn_2O_4$) and its different structures denoted by $\alpha$, $\beta$, $\gamma$, and $\lambda$. In lithium electrochemical cells, the active material is bound to an aluminum current collector with either polytetrafluoroethylene (commercially available under the trade name TEFLON™, manufactured by DuPont) or polyvinylidene fluoride mixed with conductive carbon. The conductive carbon serves as an aid for electron transfer.

Capacity fading is a major problem for rechargeable lithium cells. Capacity fading is the loss of cycle capacity in a cell over the life of an electrochemical system, limiting the practical number of cycles that may be used. In lithium battery systems, capacity fading is often attributed to the degradation of the active cathode material. This cyclic capacity loss is a result of both changes in composition and crystal structure of the active cathode material. Additionally, throughout the life of a cell, parasitic side reactions occur between chemical species of all cell components. Methods of reducing this effect include modifying the crystal structure and/or composition of the active material.

Capacity fading associated with the cathode material has also been linked to the fracture of active material and the dissociation or disconnection of the fractured active material from the electrode. Fractures are caused by mechanical stress-strain of $MnO_2$ crystal structures during cycling of the cell. Stress-strain forces act on the crystal structures as a result of repeated phase transitions. These stress-strain forces are due to the insertion and extraction of lithium in the cathode lattice. This frequent conversion in geometry and dimension of the crystal lattice creates a significant mechanical strain on the cathode. This mechanical strain is believed to electrically disconnect active material from the electrode through fracture. Additionally an external influence, such as elevated temperature, can also promote cathode fracture. In this case structural vibrations increase with temperature, resulting in the disconnection of the fractured active material from the electrode.

Another major cause of capacity fading in manganese-based cathodes is the dissolution of manganese into the electrolyte. Through a series of chemical reactions, manganese ($Mn^{2+}$) is removed from the cathode and dissolved into the electrolyte, resulting in a decrease of active material in the cathode. Manganese dissolution is linked to reactions with the electrolyte and, more importantly, the impurities dissolved within the electrolyte. Many of these reactions are linked to the water content of the electrolyte and the presence of hydrofluoric acid (HF). The products of parasitic reactions are phase transitions of the $MnO_2$ structure, which results in the formation of $Mn_2O_3$ and $Mn_3O_4$.

Manganese dioxide ($MnO_2$) provides a skeletal background for lithium intercalation during cycling of a lithium electrochemical cell. When fully charged, manganese particles have a meta-stable 4+ valence state. This meta-stable 4+ valence state allows for the attraction and intercalation of lithium cations into the lattice structure. As lithium cations fill the skeleton crystal structure during discharge, the crystal structure of the active material changes. Charging of the cell removes these lithium cations from the cathode, again altering the crystal structure. Ideally, this is a completely efficient and reversible process, but realistically, continuous crystal structure changes lead to phase transitions that can impede lithium mobility. As a result of these phase changes, unwanted crystal structures develop that are either too stable for electrochemical reactions or block the insertion/extraction paths of lithium cations into the cathode material. This general phenomenon is regarded as the major contributor to capacity fading.

$MnO_2$ exists in several phases or crystal structures and is referred to by the following prefixes: $\alpha$, $\beta$, $\gamma$, and $\lambda$. $\alpha$-$MnO_2$ is the most stable $MnO_2$ structure. $\alpha$-$MnO_2$ is one-dimensional and the lattice contains both one by one and two by two channels for lithium insertion/extraction. β-MnO$_2$ is a tetragonal structure with the lattice containing one by one channels for lithium insertion/extraction. γ-MnO$_2$ is also one-dimensional, existing in both hexagonal and orthorhombic crystal structures with a lattice that contains one by two channels for lithium insertion/extraction. Because of their stability α-MnO$_2$, β-MnO$_2$, and γ-MnO$_2$ are not considered rechargeable. However, cycling of lithium into the α-MnO$_2$, β-MnO$_2$, and γ-MnO$_2$ lattice can be achieved with rigid stoichiometric control.

λ-MnO$_2$ is another MnO$_2$ based cathode material for rechargeable lithium electrochemical systems. λ-MnO$_2$ is created through the delithiation of Li$_x$Mn$_2$O$_4$ AB$_2$O$_4$ spinel. The λ-MnO$_2$ crystal structure is maintained through both charge and discharge of the LiMn$_2$O$_4$ spinel. The maintenance of the λ-MnO$_2$ structure during insertion and extraction of lithium in the Li$_x$Mn$_2$O$_4$ spinel makes it an attractive couple with lithium for rechargeable electrochemical systems. The λ-MnO$_2$ crystal structure is a three dimensional cubic array. This crystal structure promotes mechanical stability and adequate pathways for lithium insertion/extraction. Degradation of the λ-MnO$_2$ crystal structure forming α, β, or γ-MnO$_2$ crystals and other Mn$_x$O$_y$ phases reduces the capacity of the cathode material.

As lithium intercalates, the size and orientation of the crystal structures change. In Li$_x$Mn$_2$O$_4$ spinel materials, when 0.05<x<1, the crystal structure is cubic (λ-MnO$_2$). When 1<x<1.8, the structure of Li$_x$Mn$_2$O$_4$ (no longer an AB$_2$O$_4$ spinel) is tetragonal. Additionally, when x<0.05, a phase transition to the more stable α, β, and γ MnO$_2$ can occur. Continued charge and discharge promotes the transformation of the cubic crystal structure to other cubic, tetragonal, and monoclinic phases. Tetragonal and monoclinic crystal structures may become inactive leading to the loss of active cathode material.

Voltage control, maintaining 0.05<x<1, allows for the mitigation of the formation of unwanted crystal structures. When the potential of the lithium/Li$_x$Mn$_2$O$_4$ electrochemical system is maintained between 3.0 V and 4.25 V, the cubic phase is maintained. Once the potential of the system drops below 3.0 V, the Li$_x$Mn$_2$O$_4$ cathode material undergoes a phase change from cubic to tetragonal. When the potential of the system increases above 4.25 V, the Li$_x$Mn$_2$O$_4$ cathode material becomes stripped of the lithium component and undergoes a phase change from cubic (λ-MnO$_2$) to the more stable α, β and/or γ MnO$_2$.

Other phase transitions that lead to capacity fading include the formation of Mn$_2$O$_3$ and Mn$_3$O$_4$. The Mn$_2$O$_3$ and Mn$_3$O$_4$ formations result from the liberation of oxygen in the MnO$_2$ and Mn$_2$O$_4$ structures. The valence state of manganese in these structures is 3+ or less. This lower valence state creates a stable crystal structure that is not conducive to lithium intercalation and, therefore, not rechargeable. As more Mn$_2$O$_3$ and Mn$_3$O$_4$ are formed, less MnO$_2$ and Mn$_2$O$_4$ remain and the usefulness of the cathode decreases. Thus, one of the disadvantages of conventional lithium manganese-based MnO$_2$ materials is the limited cycle life and limited rate capability for lithium electrochemical systems.

SUMMARY OF THE INVENTION

The present disclosure resolves the aforementioned problems associated with conventional lithium manganese-based cathode materials in lithium electrochemical systems and rechargeable lithium electrochemical systems. The present disclosure provides a homogeneously dispersed Group VIII Period 4 element (iron, cobalt, and nickel) metal site and chlorine "oxygen" site (chlorine "O" site) modified lithium manganese-based Li$_a$Mn$_{1-x-y-z}$Fe$_x$Co$_y$Ni$_z$O$_{2-d}$Cl$_d$ cathode material. Metal site modification refers to substitution of manganese with iron, cobalt, and/or nickel. The present Group VIII Period 4 element (iron, cobalt, and nickel) metal site and chlorine "O" site modified lithium manganese-based (λ-MnO$_2$) cathode material exhibits overvoltage and undervoltage tolerance and avoids problems associated with loss of reversibility in lithium batteries without suffering from the disadvantages, limitations, and shortcomings associated with rigid stoichiometry electronic control. While conventional preparation methods tend to produce materials with concentration gradients radiating from the particle edge to the particle core, the preparation methods according to the present disclosure provide for an even distribution within the body of the particle, and also provide for a submicron particle size of uniform size.

In one embodiment, a method of preparing a homogeneously dispersed Group VIII Period 4 element "metal" site and chlorine "oxygen" site modified lithium manganese based Li$_a$Mn$_{1-x-y-z}$Fe$_x$Co$_y$Ni$_z$O$_{2-d}$Cl$_d$ cathode material includes mixing a manganese source, at least two Group VIII Period 4 sources, and a liquid to form a solution. A gel is formed from the solution and the gel is heated to form a solid. The solid is calcined to produce the homogeneously dispersed Group VIII Period element "metal" site and chlorine "oxygen" site modified lithium manganese based Li$_a$Mn$_{1-x-y-z}$Fe$_x$Co$_y$Ni$_z$O$_{2-d}$Cl$_d$ cathode material. The at least two Group VIII Period 4 element sources are selected from a group consisting of an iron source, a cobalt source, and a nickel source. The iron source is selected from a group consisting of iron nitrate and iron acetate, the cobalt source is selected from a group consisting of cobalt nitrate and cobalt acetate, the nickel source is selected from a group consisting of nickel nitrate and nickel acetate, x+y is greater than zero, x+z is greater than zero, and y+z is greater than zero.

In another embodiment, a homogeneously dispersed Group VIII Period element "metal" site and chlorine "oxygen" site modified lithium manganese based Li$_a$Mn$_{1-x-y-z}$Fe$_x$Co$_y$Ni$_z$O$_{2-d}$Cl$_d$ cathode material is disclosed. In this embodiment, x+y is greater than zero, x+z is greater than zero, y+z is greater than zero, a ranges from 0.025 to 0.975, and d ranges from 0.001 to 0.125.

In yet another embodiment, the present disclosure provides a lithium electrochemical cell that includes an anode and a cathode including the present homogeneously dispersed Group VIII Period element "metal" site and chlorine "oxygen" site modified lithium manganese based Li$_a$Mn$_{1-x-y-z}$Fe$_x$Co$_y$Ni$_z$O$_{2-d}$Cl$_d$ cathode material. In this embodiment, x+y is greater than zero, x+z is greater than zero, y+z is greater than zero, a ranges from 0.025 to 0.975, and d ranges from 0.001 to 0.125.

BRIEF DESCRIPTION OF THE DRAWINGS

The accompanying drawings, which are included to provide further understanding of the present disclosure, and are incorporated in and constitute a part of the specification, illustrate exemplary embodiments of the present disclosure, and together with the description serve to explain the principles of the present disclosure. The present disclosure will now be described further with reference to the accompanying drawings as follows.

$Co_yNi_zO_{2-d}Cl_d$. The method illustrated in the figure describes an aspect that includes transesterification polymerization of the starting material, as well as an aspect that includes a nitrate flame process.

Figure 2:
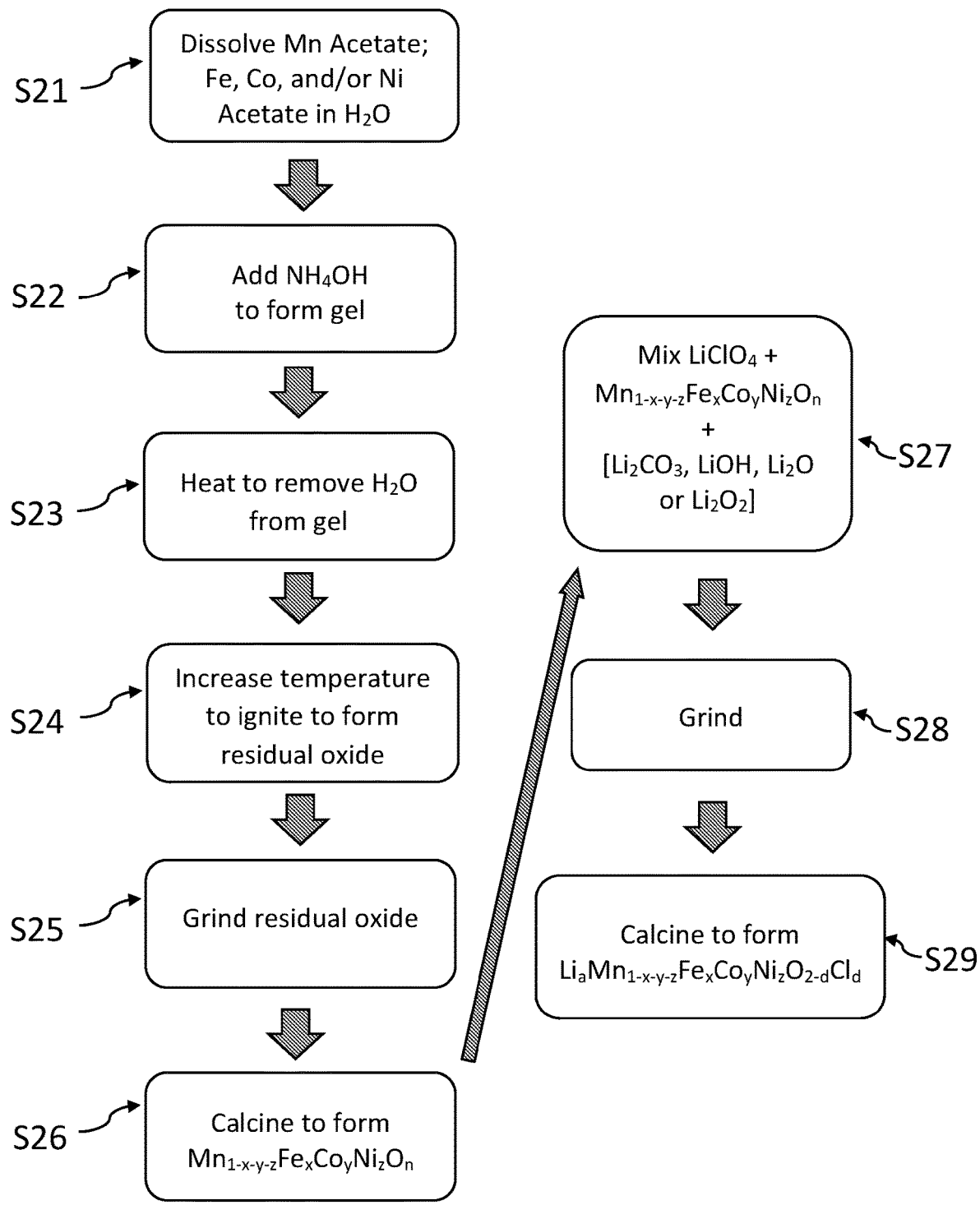

FIG. 2 is a flowchart illustrating process steps in an exemplary embodiment of the present disclosure, which yields a homogeneously dispersed $Li_aMn_{1-x-y-z}Fe_xCo_yNi_zO_{2-d}Cl_d$. The method illustrated in the figure includes a hydrothermal co-precipitation process producing an intermediate and a solid state addition of chemical salts and calcining, forming the final product.

Figure 3:
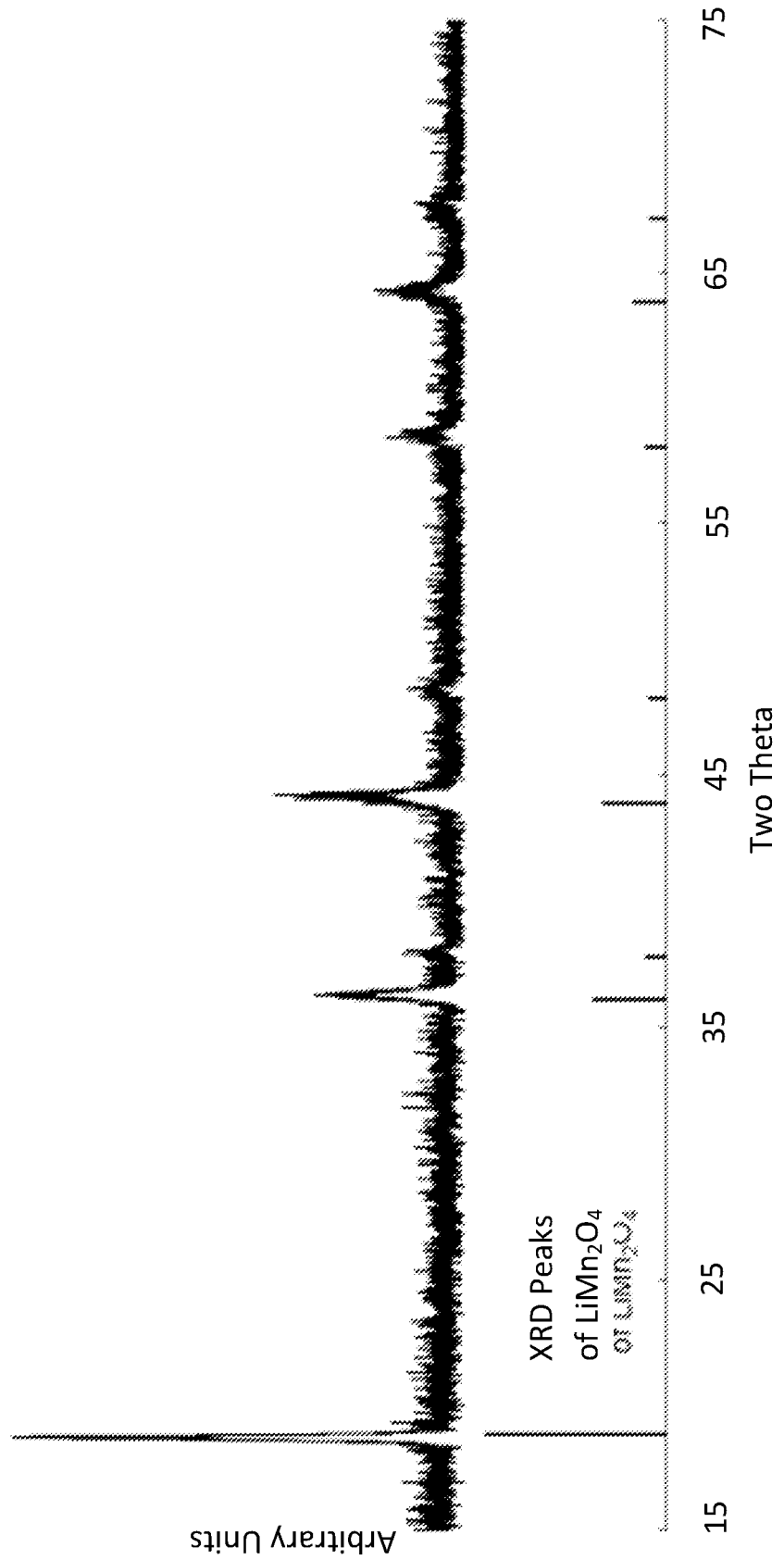

FIG. 3 is a graph showing x-ray diffraction data for an exemplary formulation mixture according to exemplary embodiments of the present disclosure compared to $LiMn_2O_4$ as a reference standard.

Figure 4:
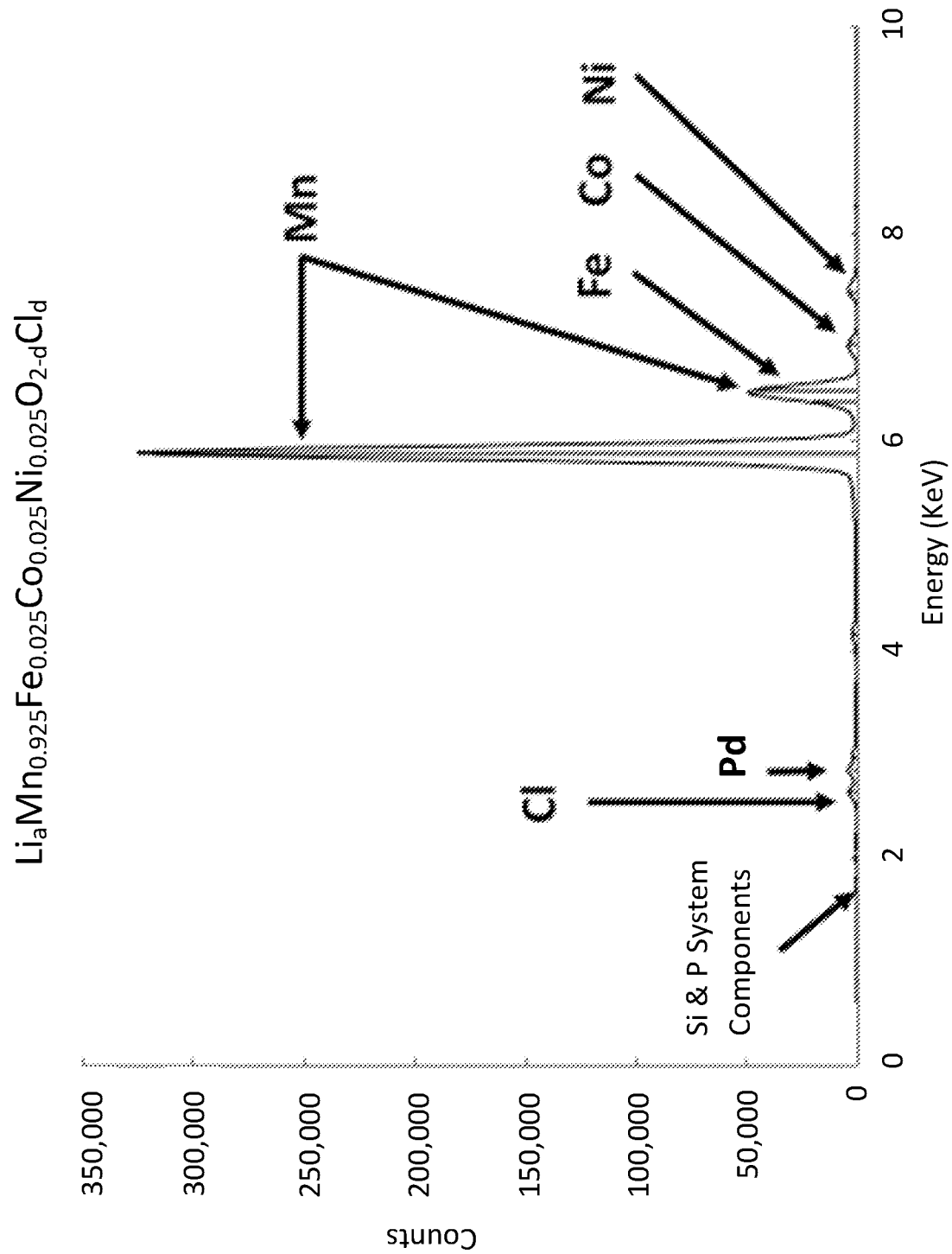

FIG. 4 is a graph showing x-ray fluorescence data for an exemplary formulation mixture according to exemplary embodiments of the present disclosure, compared to system components Si and P, the Pd x-ray source, and reference standards Cl, Mn, Fe, Co and Ni.

Figure 5:
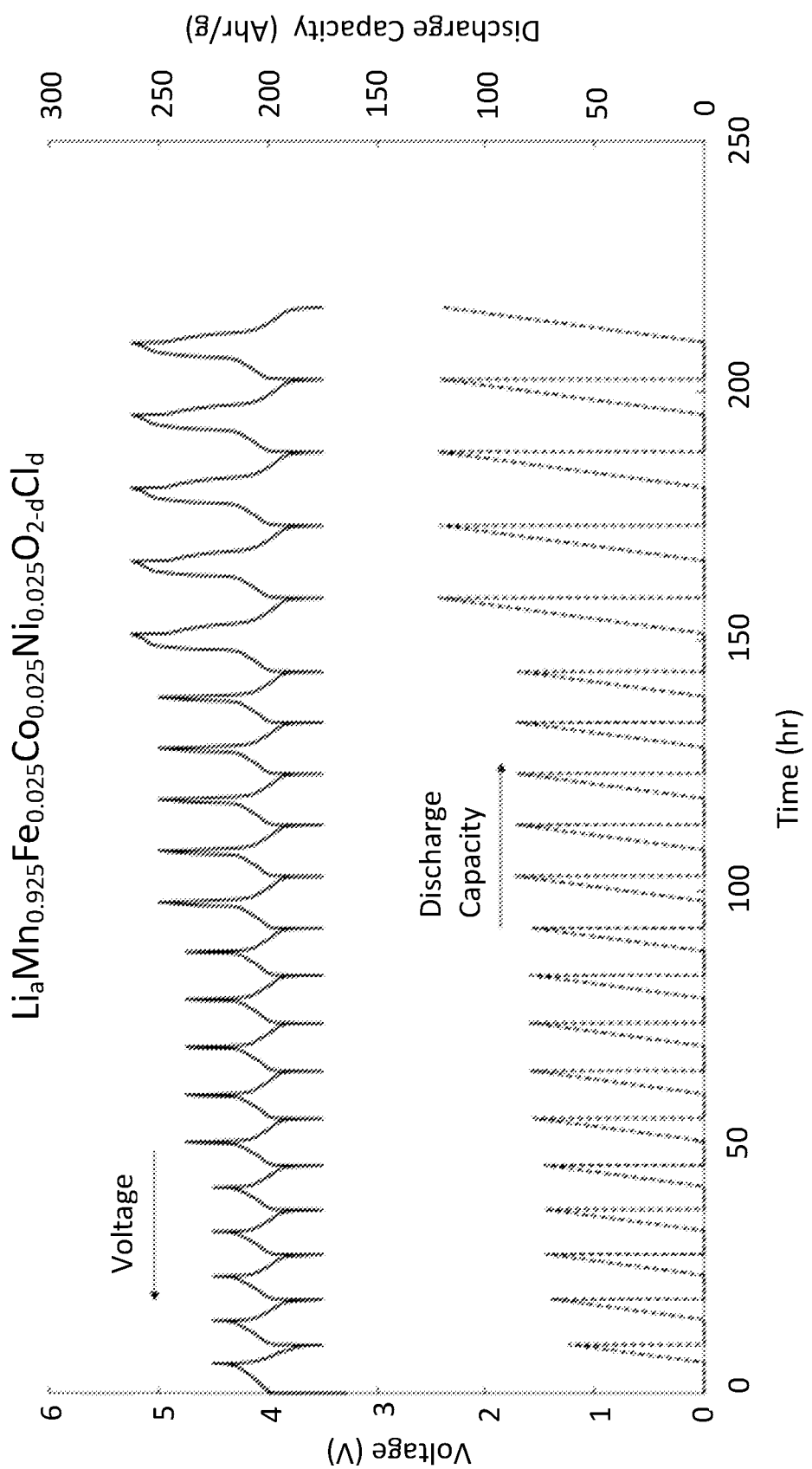

FIG. 5 is a plot containing the initial twenty charge/discharge cycle potential traces, the charge capacity and delivered discharge capacity per cycle of an exemplary lithium cell containing an exemplary formulation mixture according to an exemplary embodiment of the present disclosure.

Figure 6:
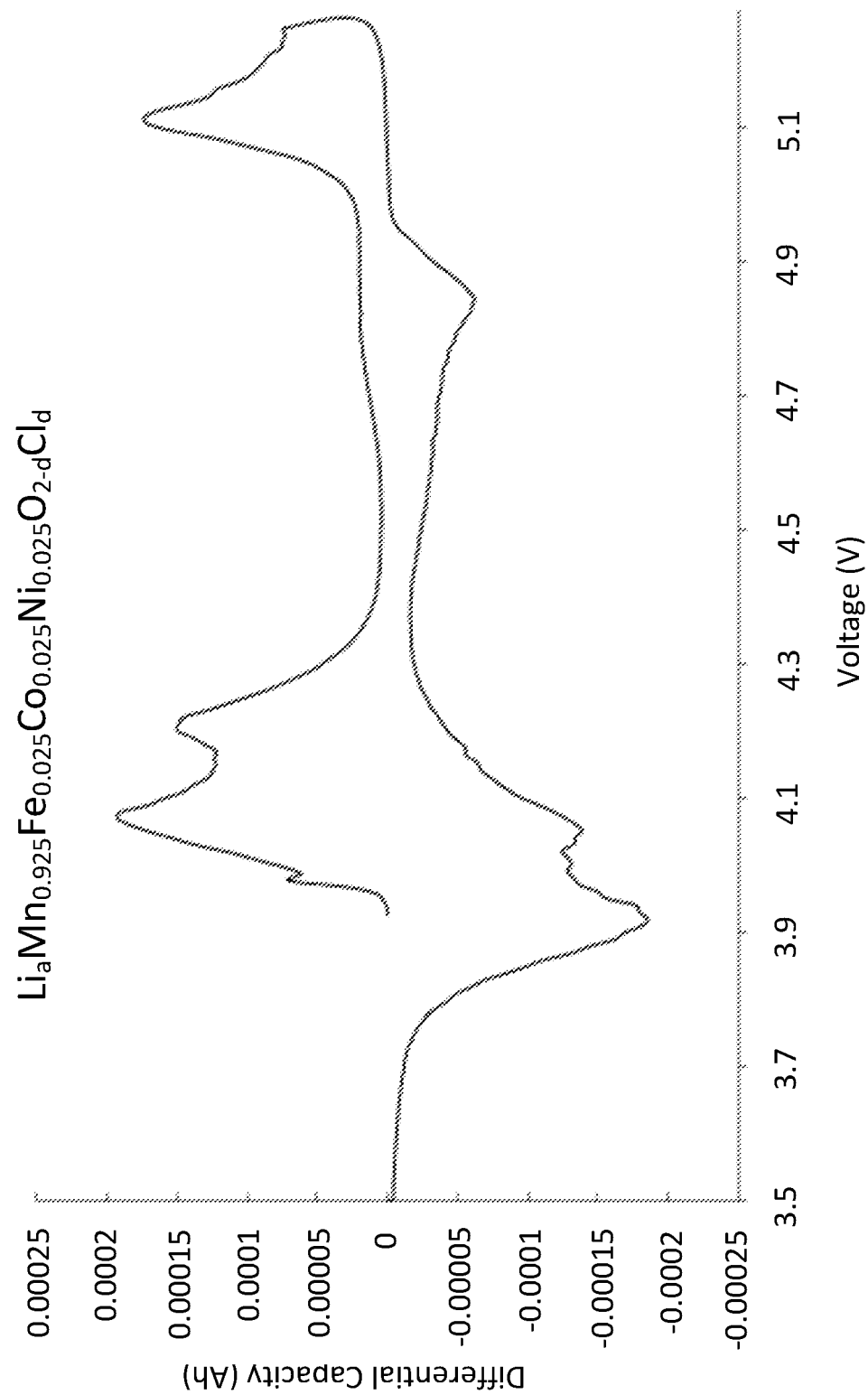

FIG. 6 is a differential capacity graph illustrating the sixteenth cycle trace for a lithium cell containing an exemplary formulation mixture according to an exemplary embodiment of the present disclosure.

Figure 7:
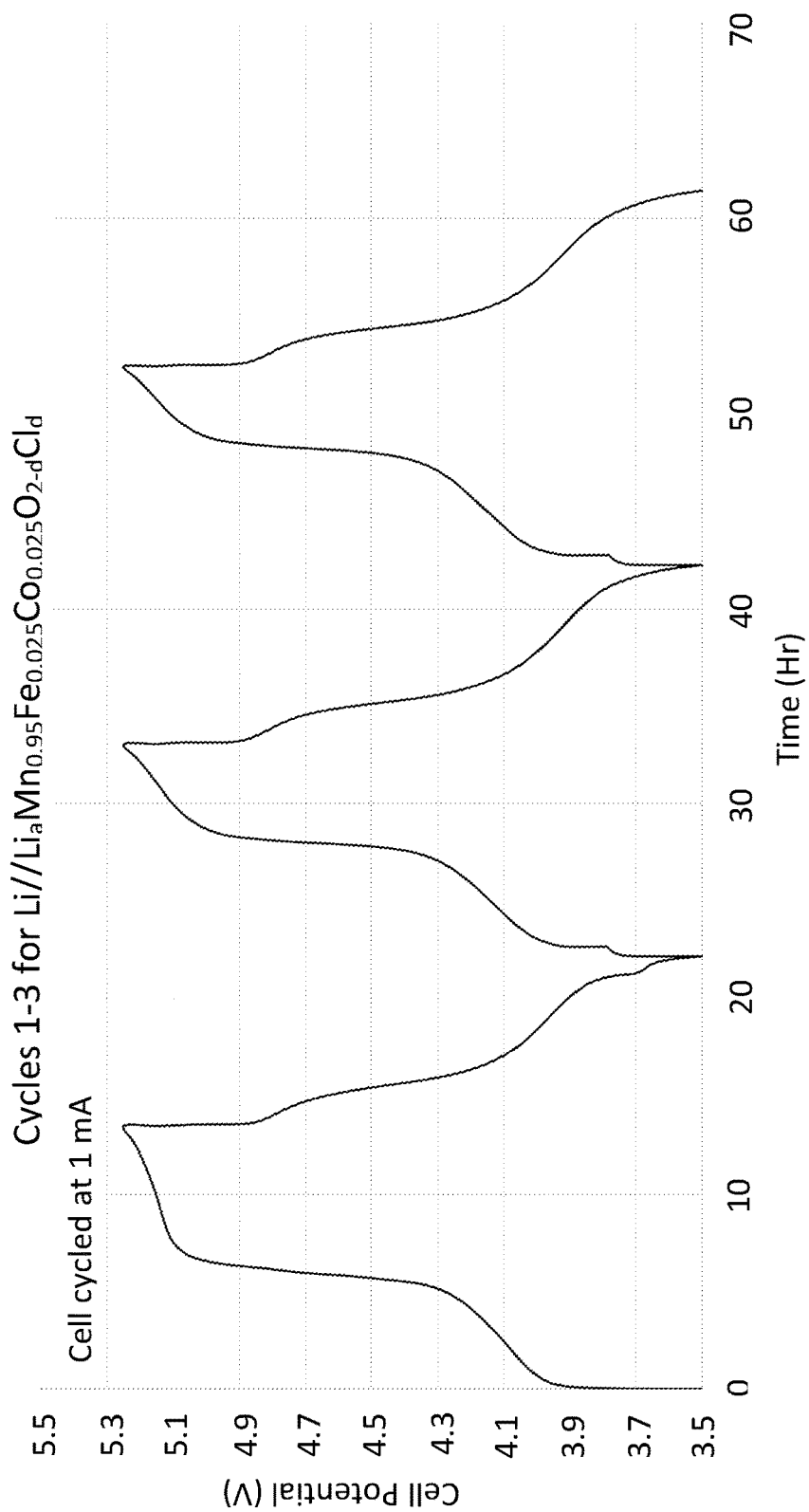

FIG. 7 is a graph illustrating representative initial cycle (charge/discharge) curves for a lithium cell containing an exemplary formulation mixture according to an exemplary embodiment of the present disclosure.

Figure 8:
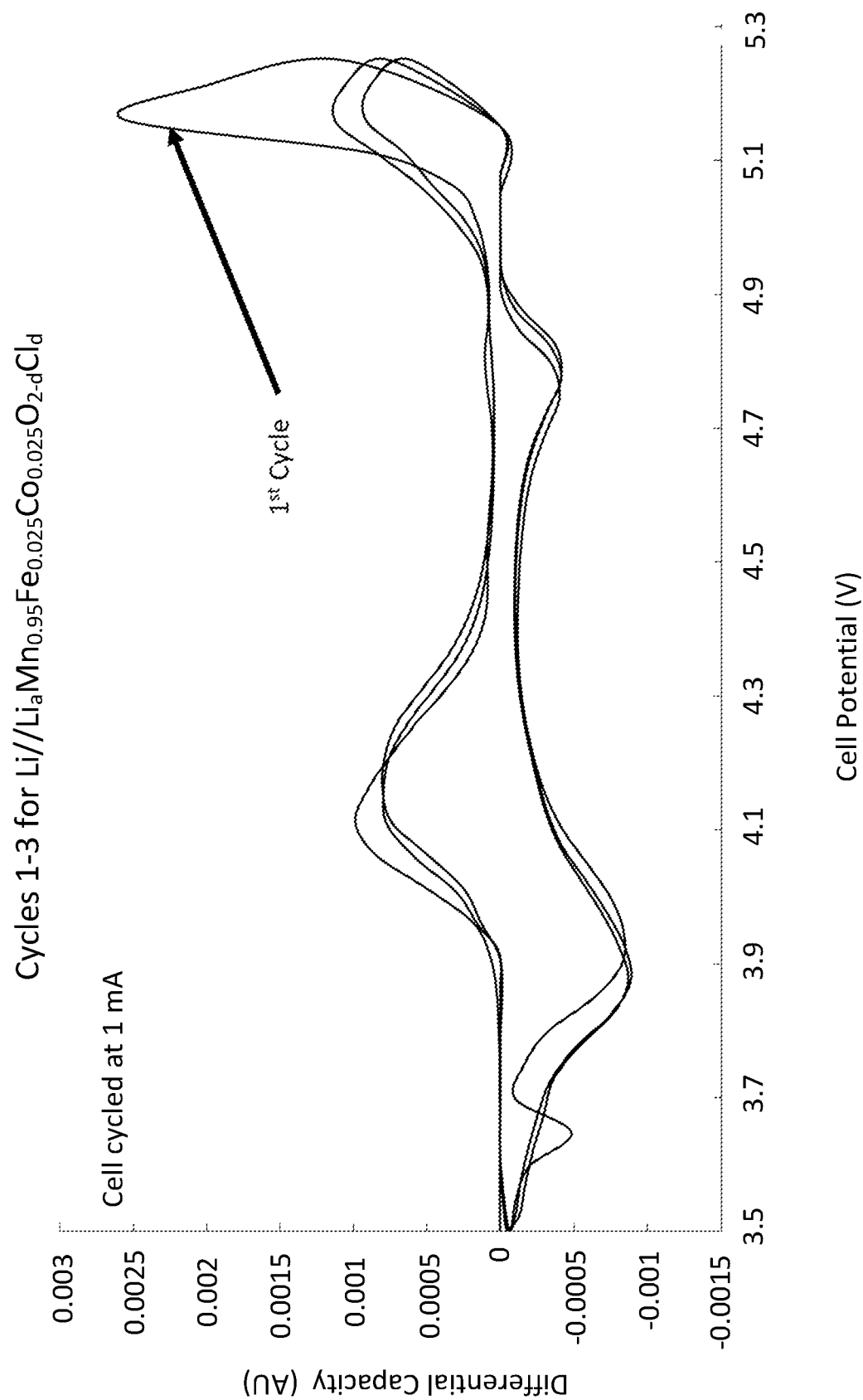

FIG. 8 is a graph illustrating differential capacity curves during initial charge/discharge cycles for a lithium cell containing an exemplary formulation mixture according to an exemplary embodiment of the present disclosure.

Figure 9:
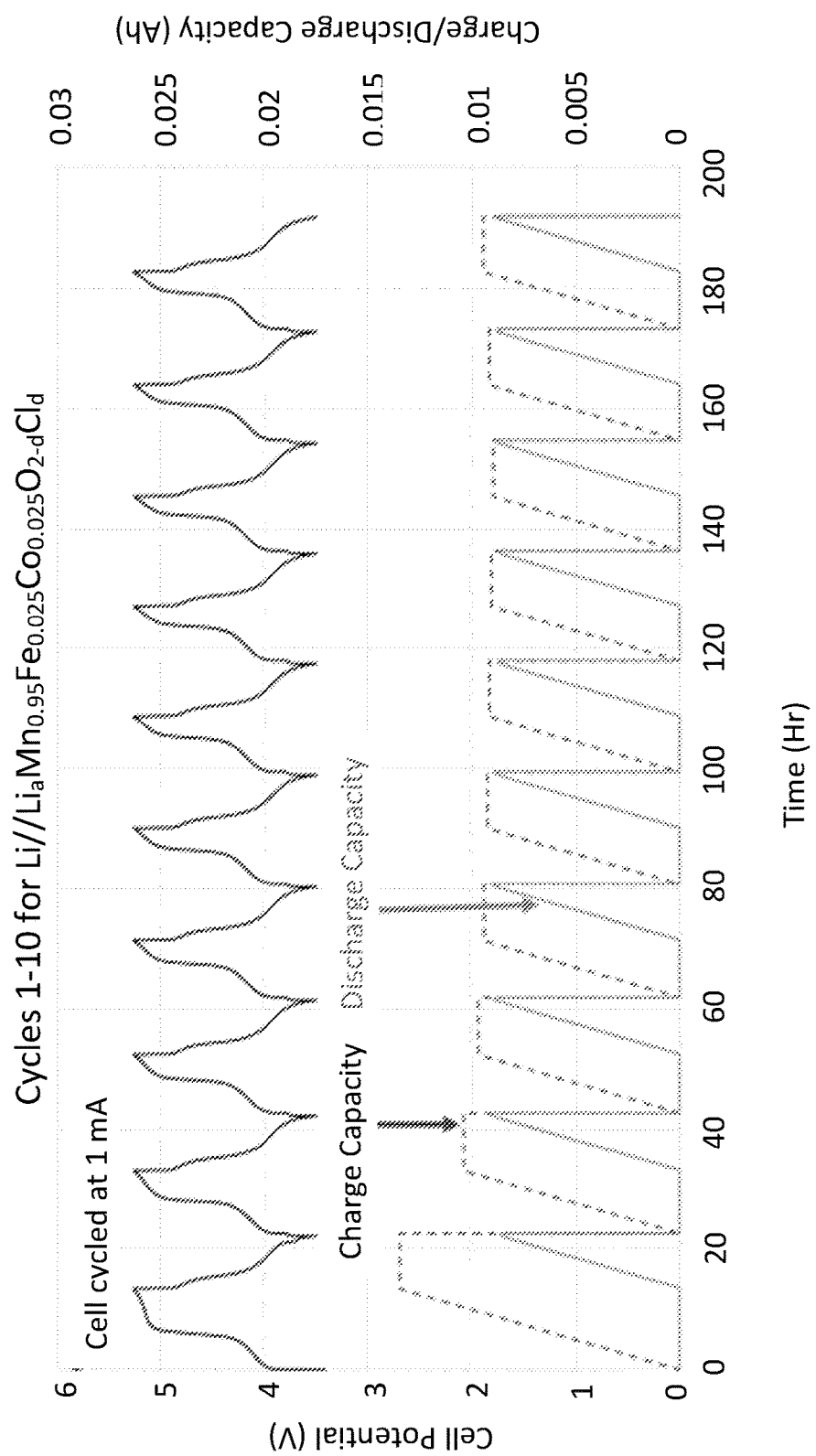

FIG. 9 is a plot containing the initial ten charge/discharge cycle potential traces, the charge capacity and delivered discharge capacity per cycle of an exemplary lithium cell containing an exemplary formulation mixture according to an exemplary embodiment of the present disclosure.

Figure 10:
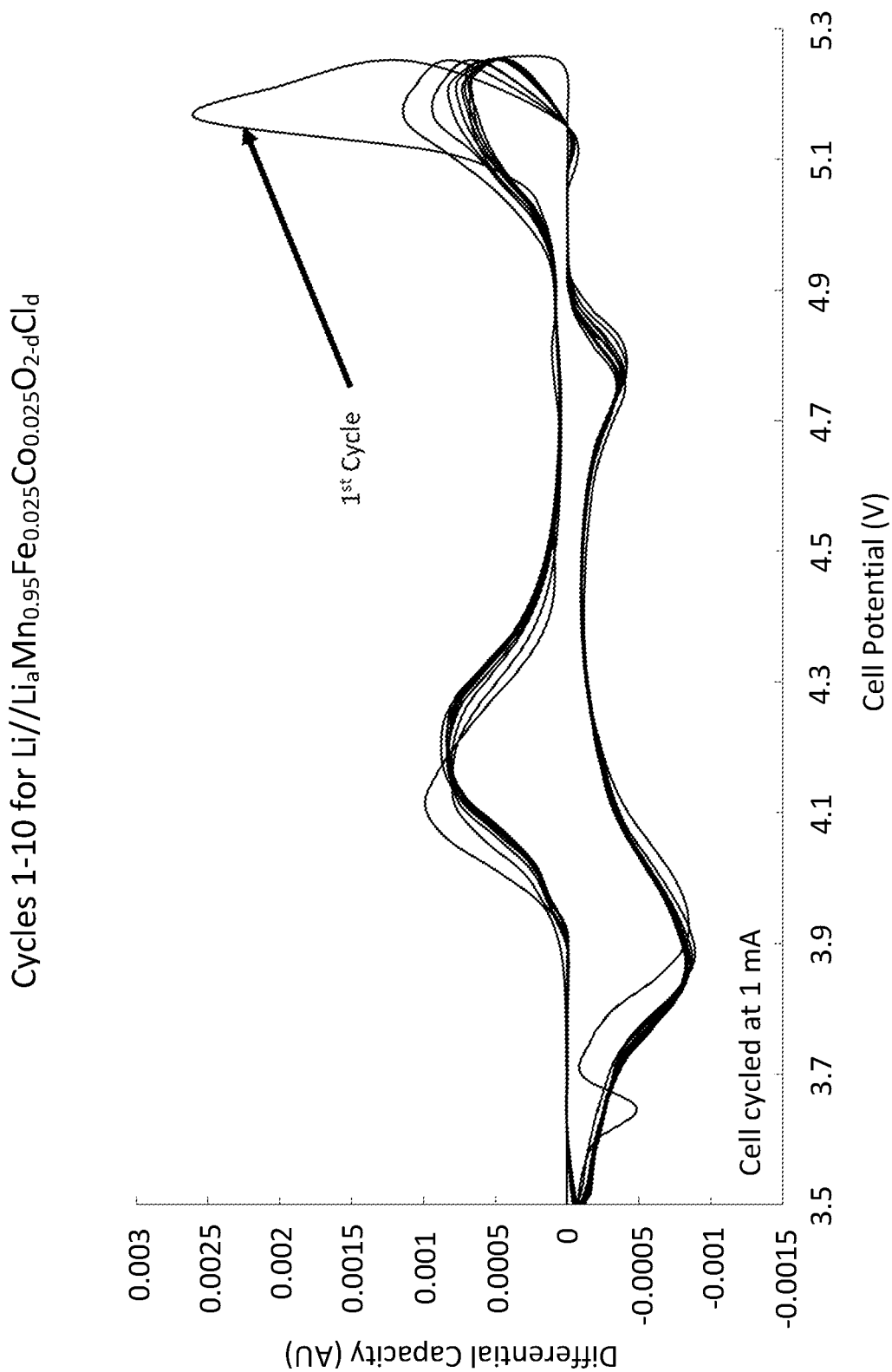

FIG. 10. is a differential capacity graph illustrating the initial ten charge/discharge cycle traces for a lithium cell containing an exemplary formulation mixture according to an exemplary embodiment of the present disclosure.

Figure 11:
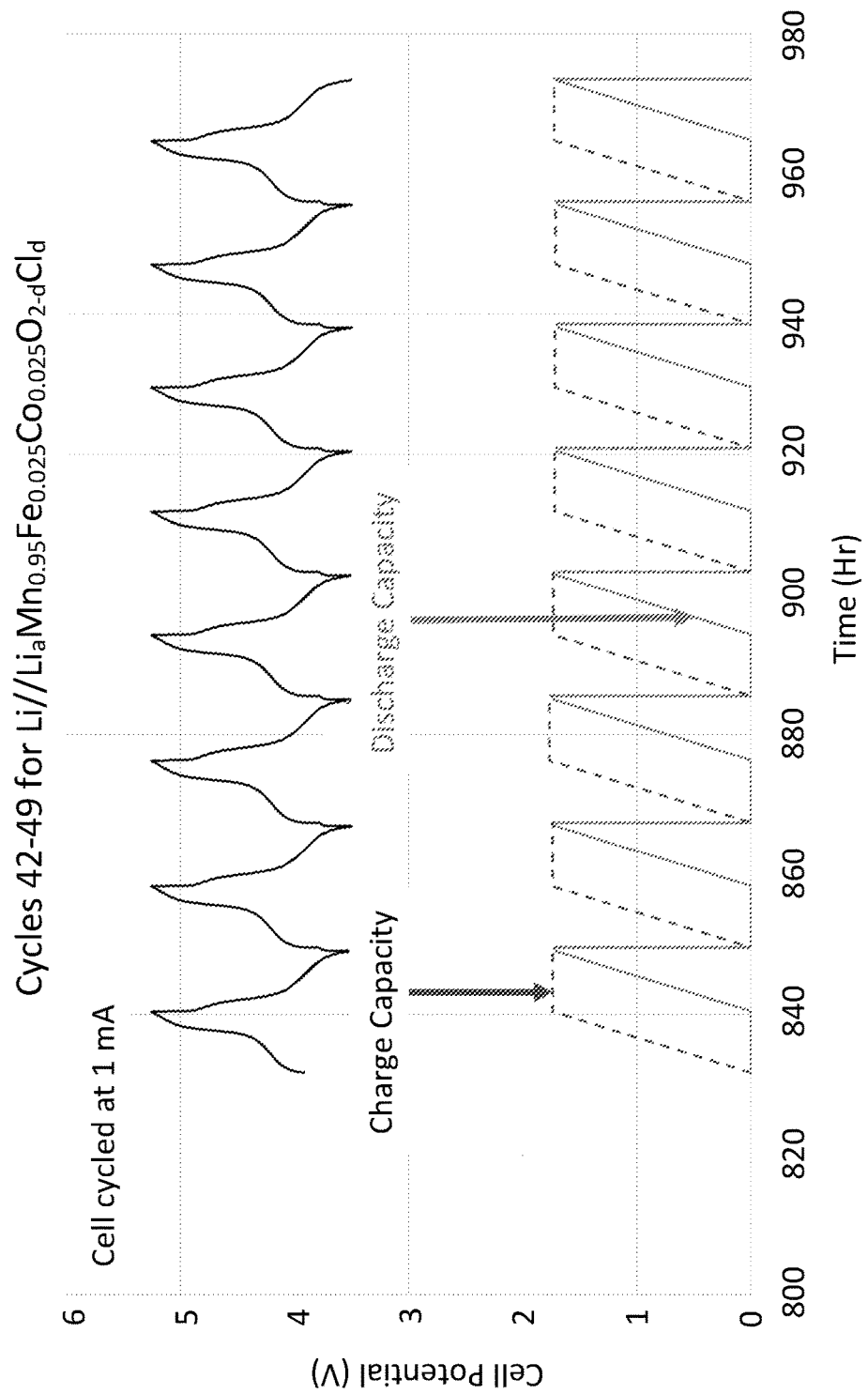

FIG. 11 is a plot containing cycles 42 to 49 charge/discharge cycle potential traces, the charge capacity and delivered discharge capacity per cycle of an exemplary lithium cell containing an exemplary formulation mixture according to an exemplary embodiment of the present disclosure.

Figure 12:
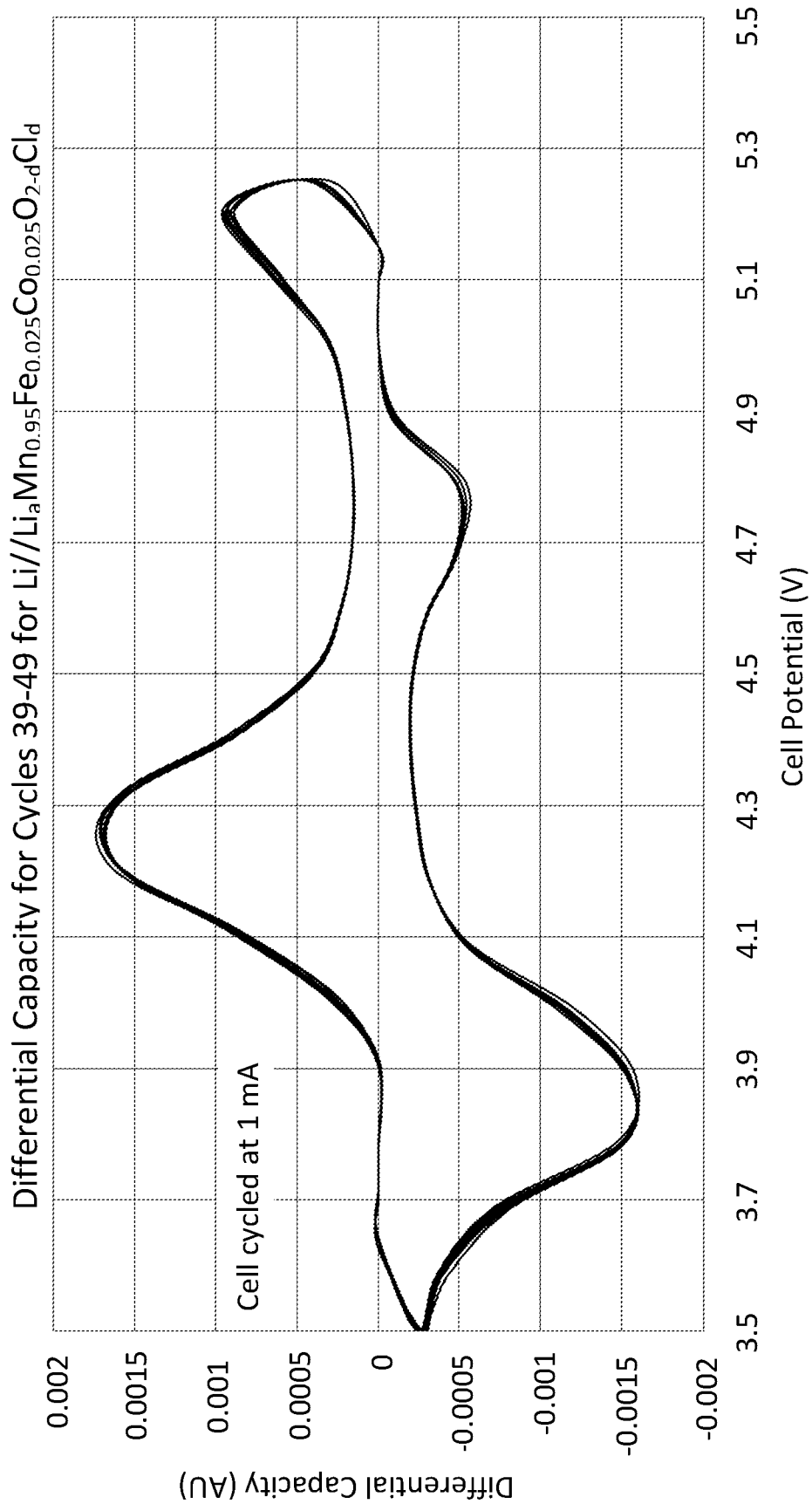

FIG. 12 is a differential capacity graph illustrating the cycles 39 through 49 charge/discharge cycle traces for a lithium cell containing an exemplary formulation mixture according to an exemplary embodiment of the present disclosure.

Figure 13:
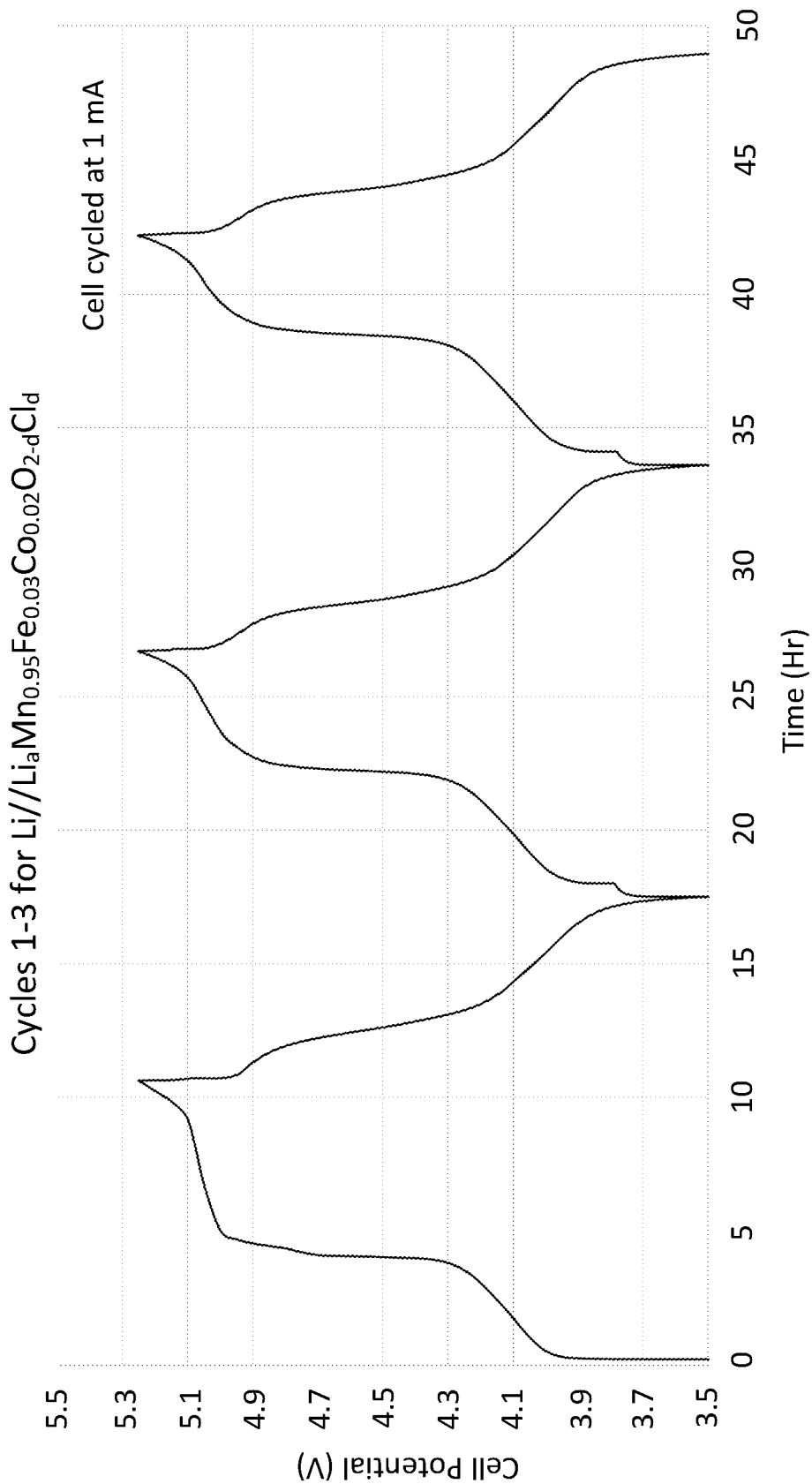

FIG. 13 is a graph illustrating representative initial cycle (charge/discharge) curves for a lithium cell containing an exemplary formulation mixture according to an exemplary embodiment of the present disclosure.

Figure 14:
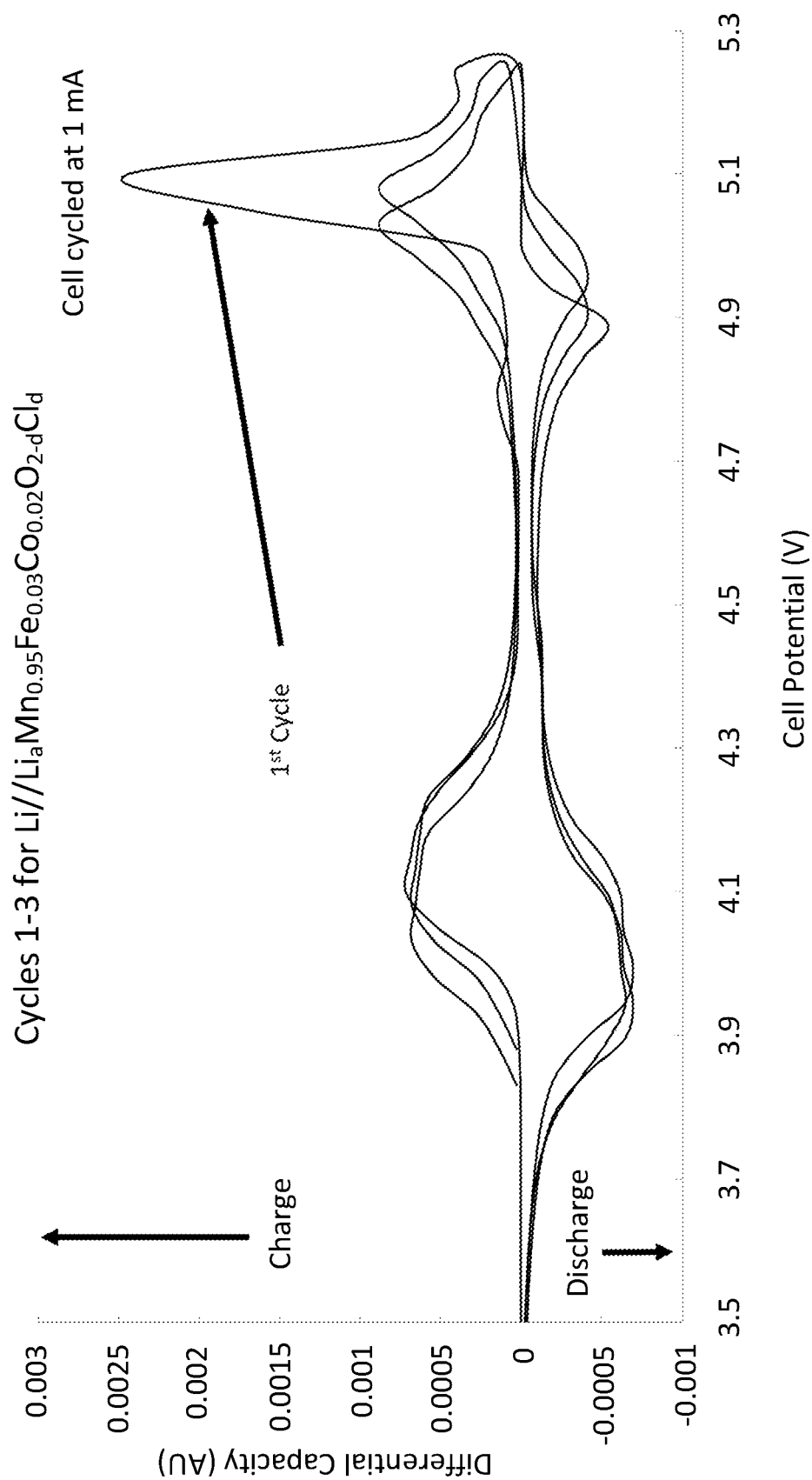

FIG. 14 is a differential capacity graph illustrating charge/discharge cycle traces for cycles 1-3 for a lithium cell containing an exemplary formulation mixture according to an exemplary embodiment of the present disclosure.

Figure 15:
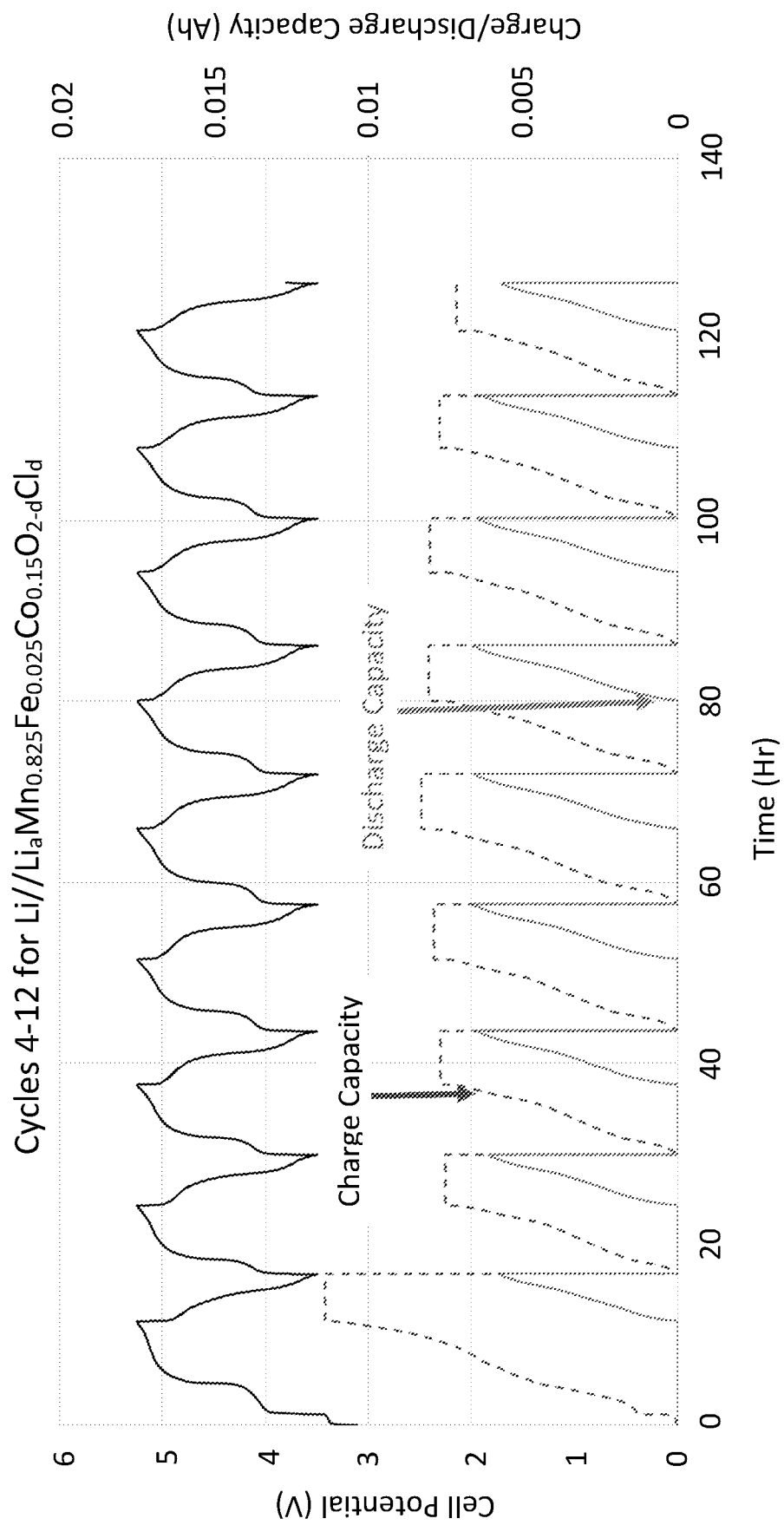

FIG. 15 is a plot showing potential as a function of time, the charge capacity, and delivered discharge capacity per cycle for cycles 4-10 of an exemplary lithium cell containing an exemplary formulation mixture according to an exemplary embodiment of the present disclosure.

Figure 16:
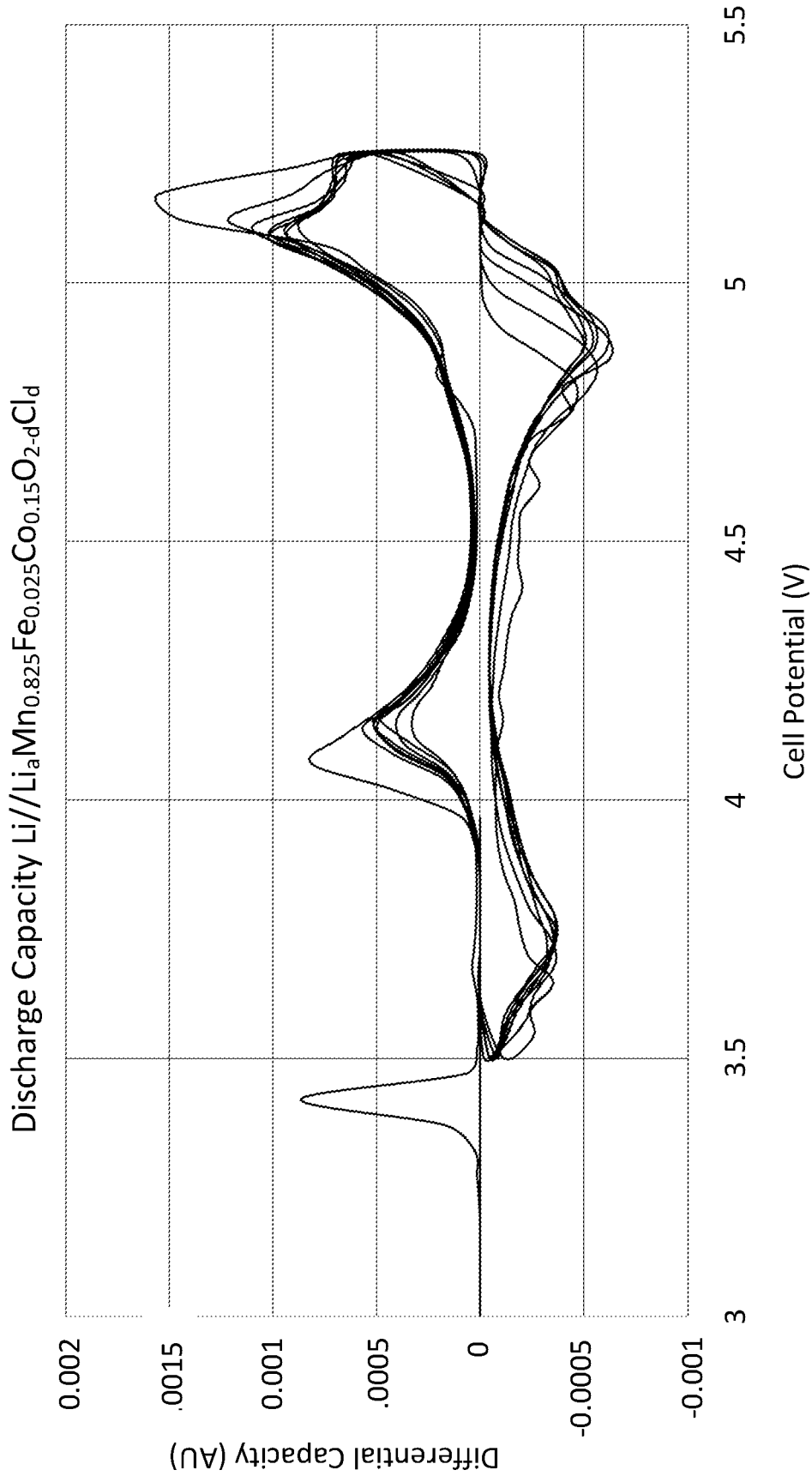

FIG. 16 is a differential capacity graph illustrating cycles 4-10 charge/discharge cycle traces for a lithium cell containing an exemplary formulation mixture according to an exemplary embodiment of the present disclosure.

Figure 17:
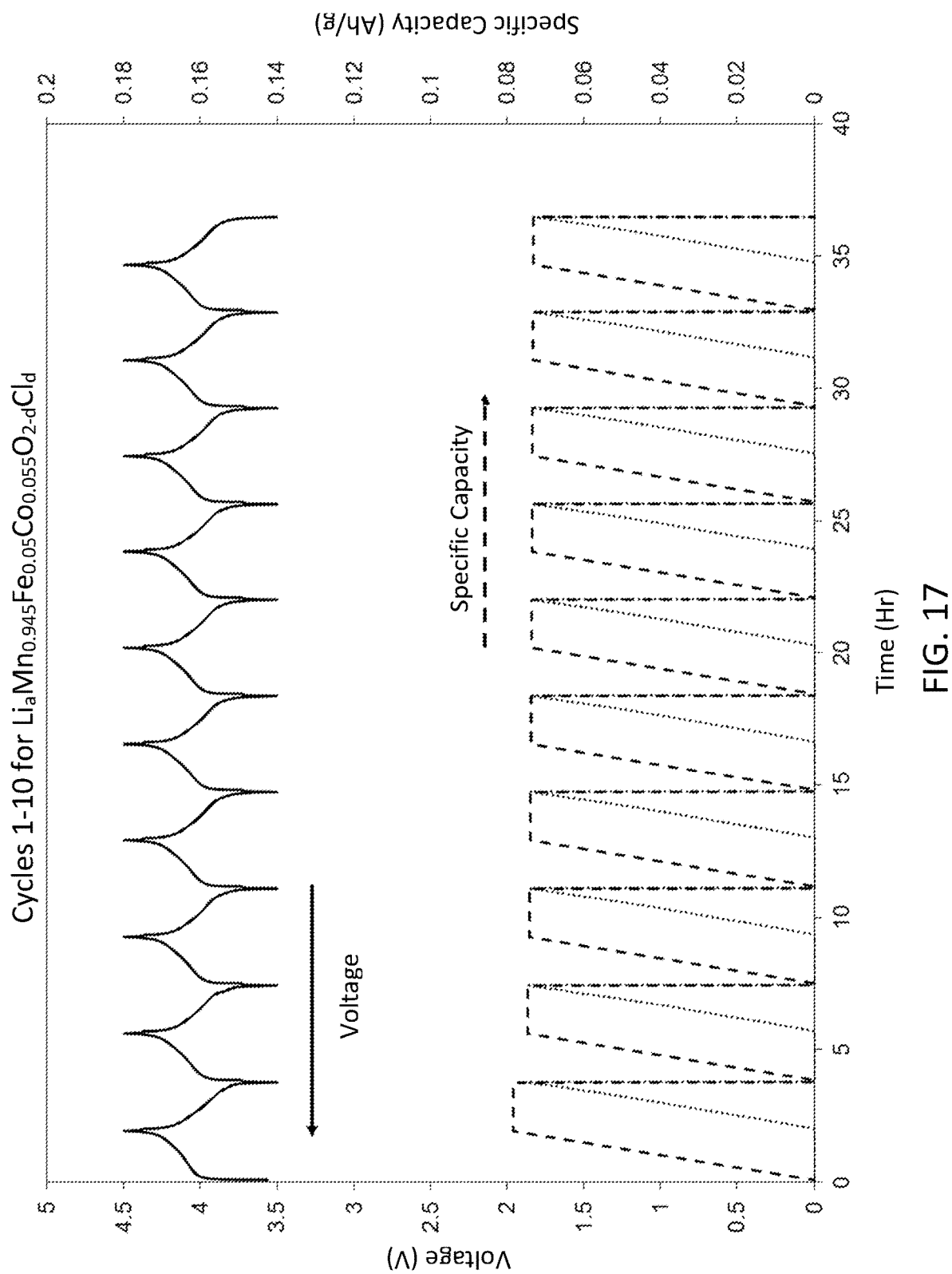

FIG. 17 is a graph illustrating potential as a function of time, the charge capacity, and delivered discharge capacity per cycle for cycles 1-10 of an exemplary lithium cell containing an exemplary formulation mixture according to an exemplary embodiment of the present disclosure.

Figure 18:
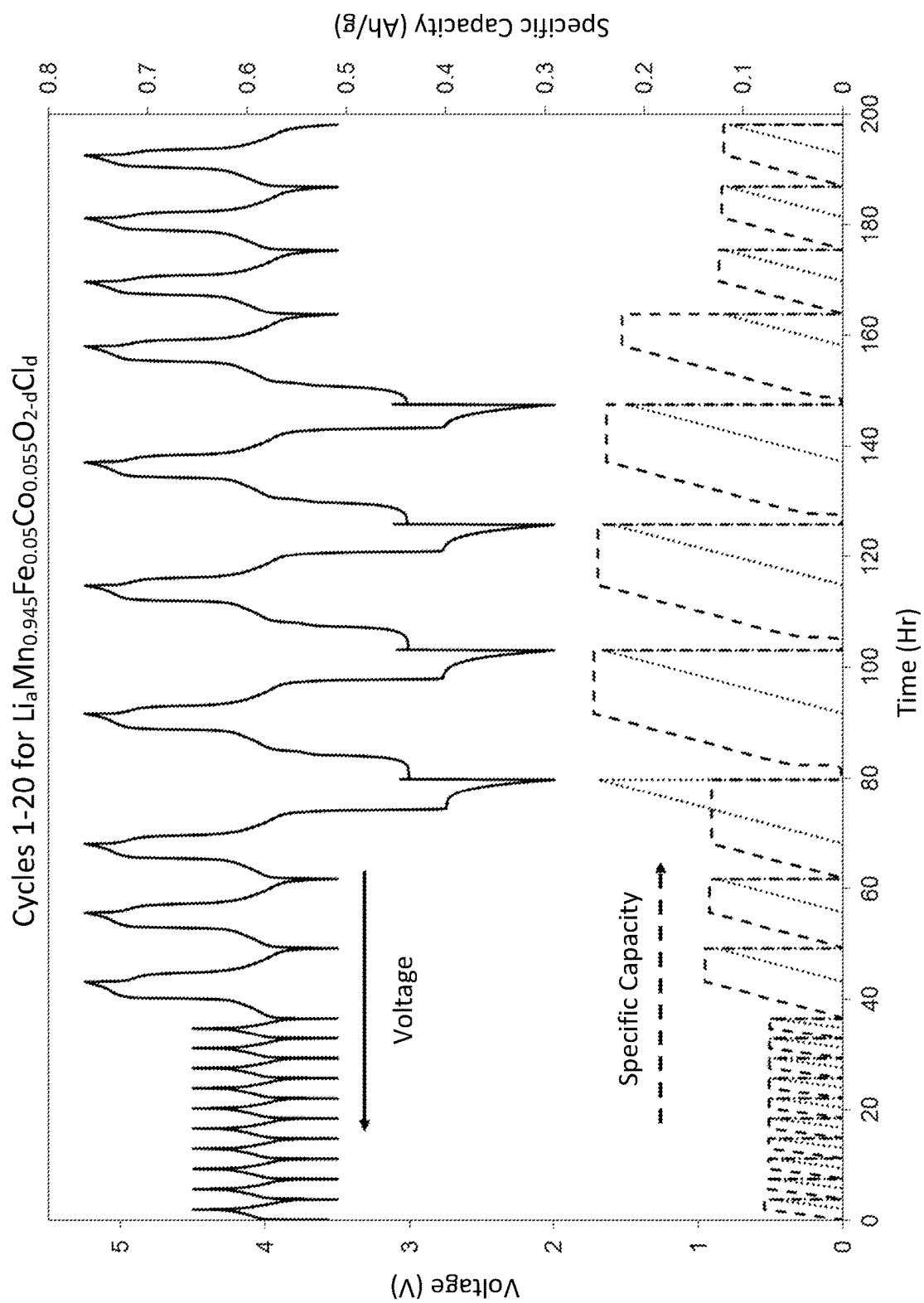

FIG. 18 is a graph illustrating potential as a function of time, the charge capacity, and delivered discharge capacity per cycle for cycles 1-20 of a lithium cell containing an exemplary formulation mixture according to an exemplary embodiment of the present disclosure.

Figure 19:
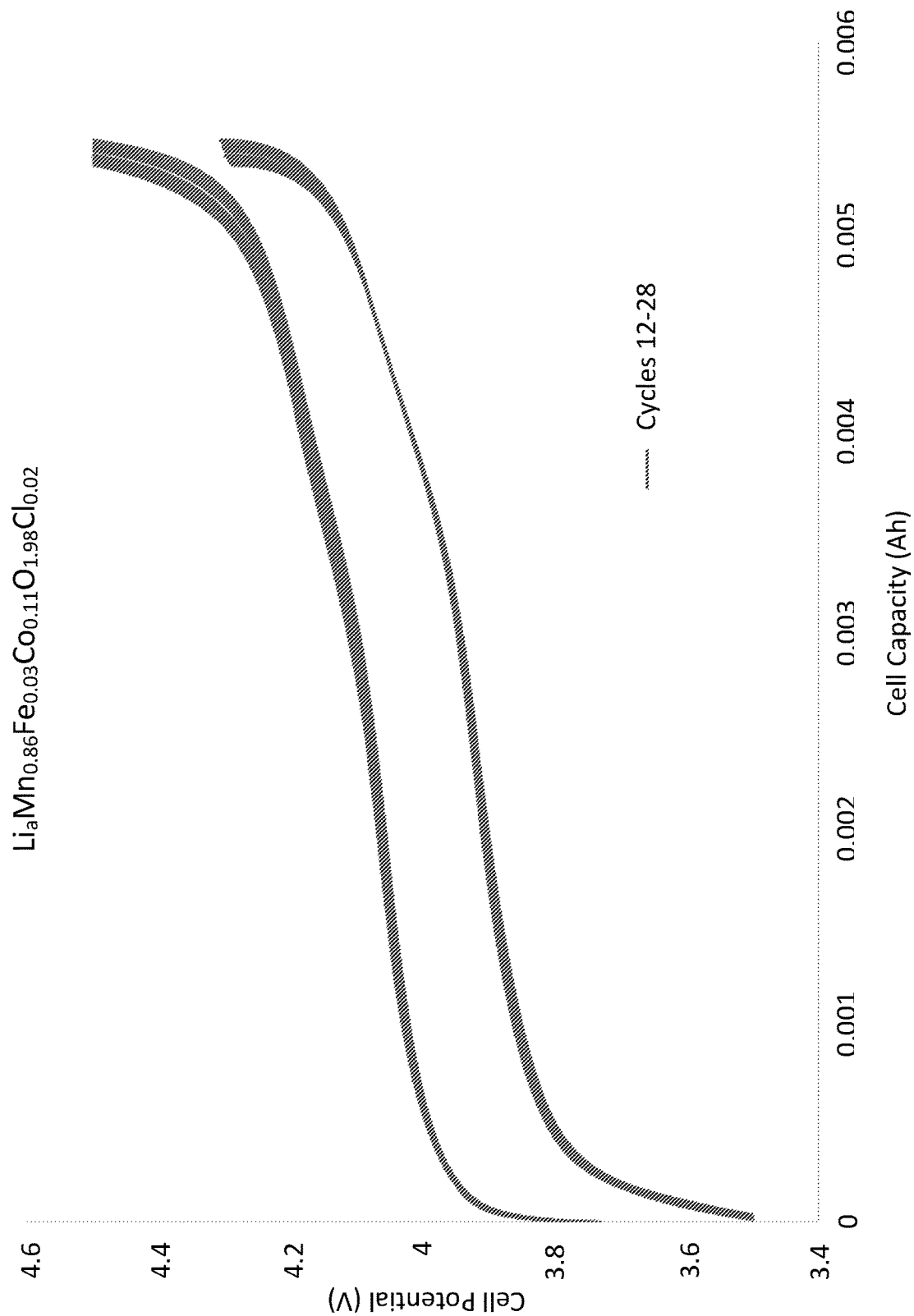

FIG. 19 is a graph showing cell potential (V) as a function of cell capacity (Ah) for cycles 12-28 of a lithium cell containing an exemplary formulation mixture according to an exemplary embodiment of the present disclosure.

Figure 20:
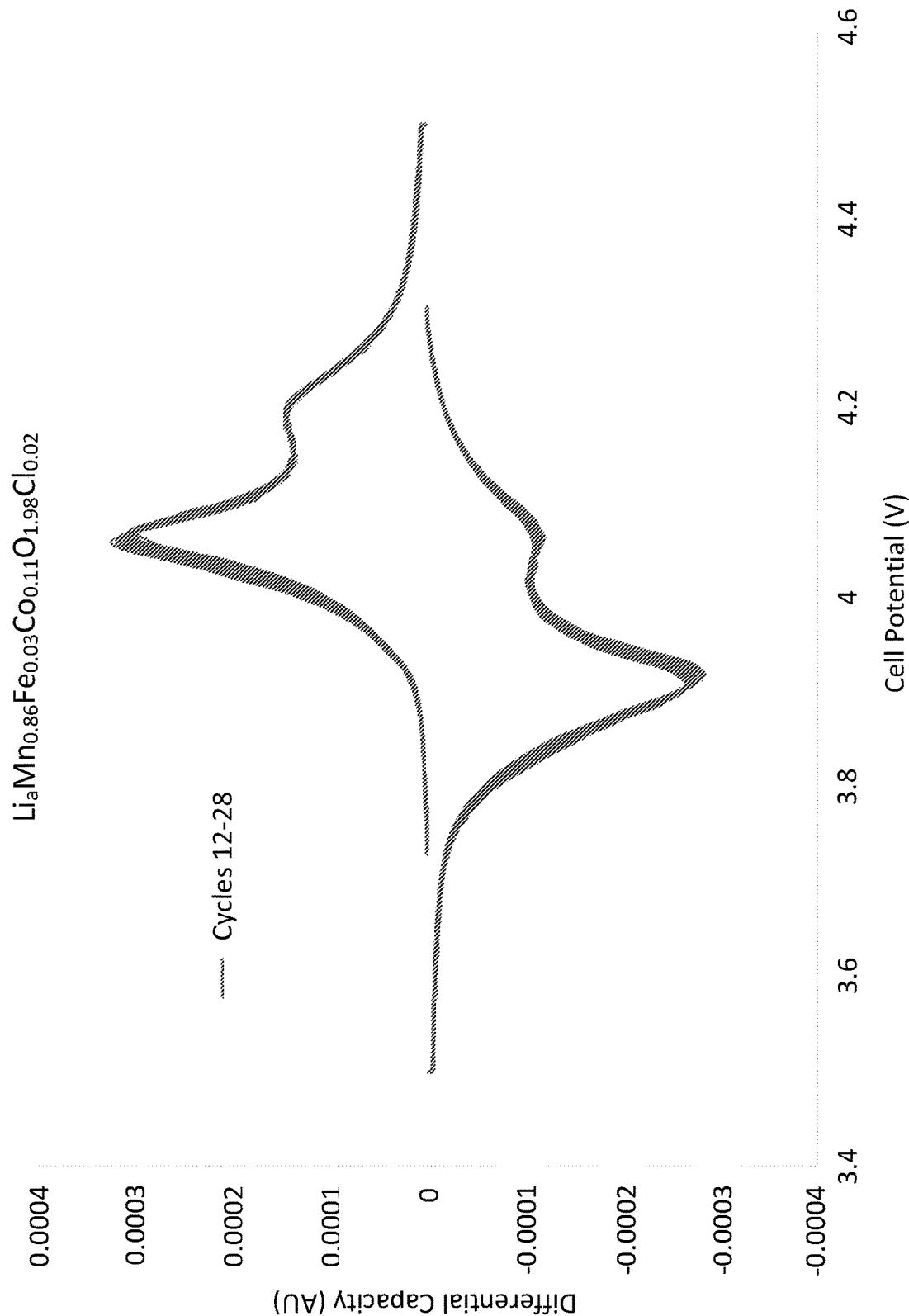

FIG. 20 is a differential capacity graph illustrating charge/discharge cycle traces of cycles 12-28 for an exemplary formulation mixture according to an exemplary embodiment of the present disclosure.

Figure 21:
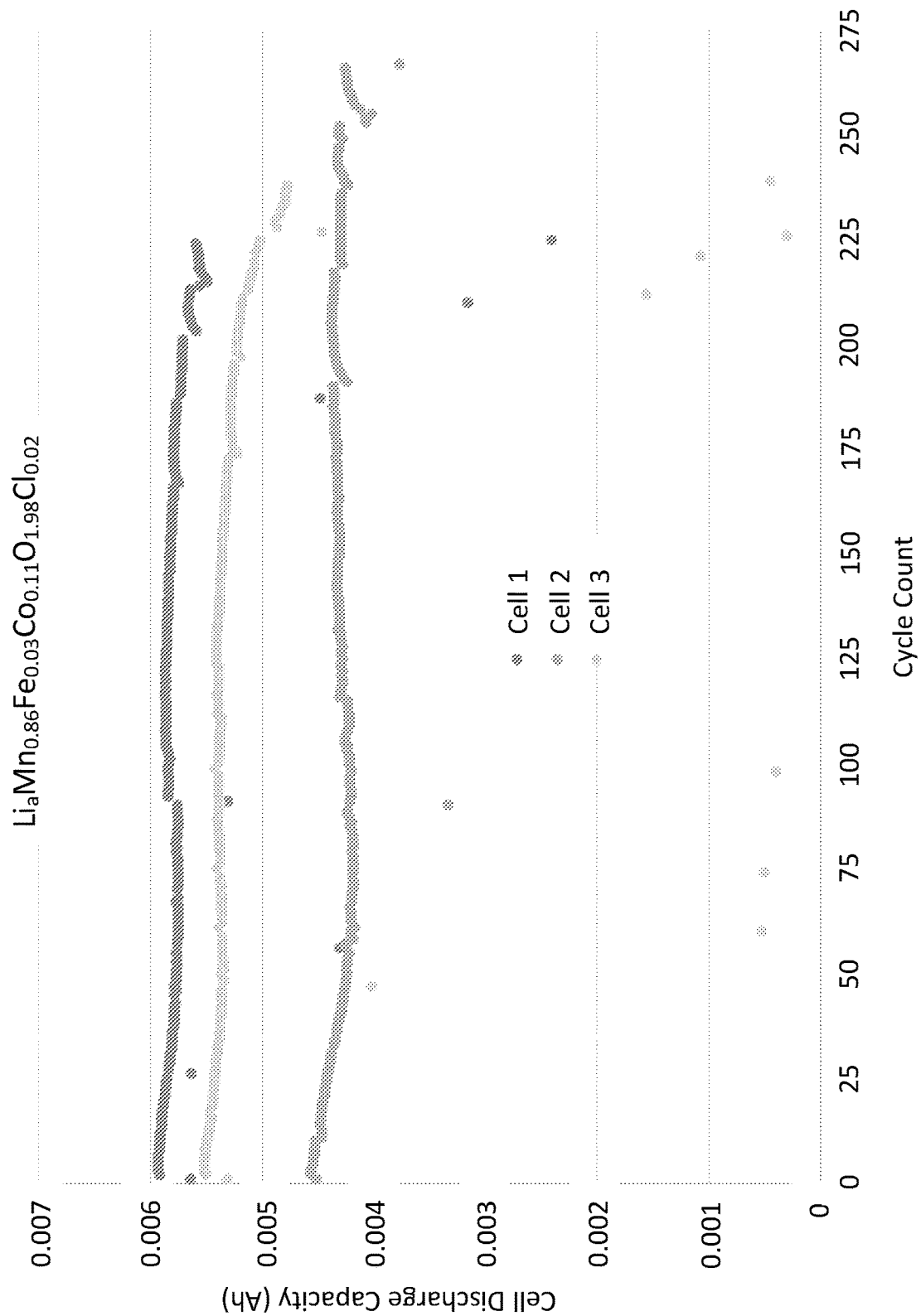

FIG. 21 shows exemplary cycle life plots for three different lithium electrochemical cells fabricated with an exemplary formulation mixture according to an exemplary embodiment of the present disclosure.

Figure 22:
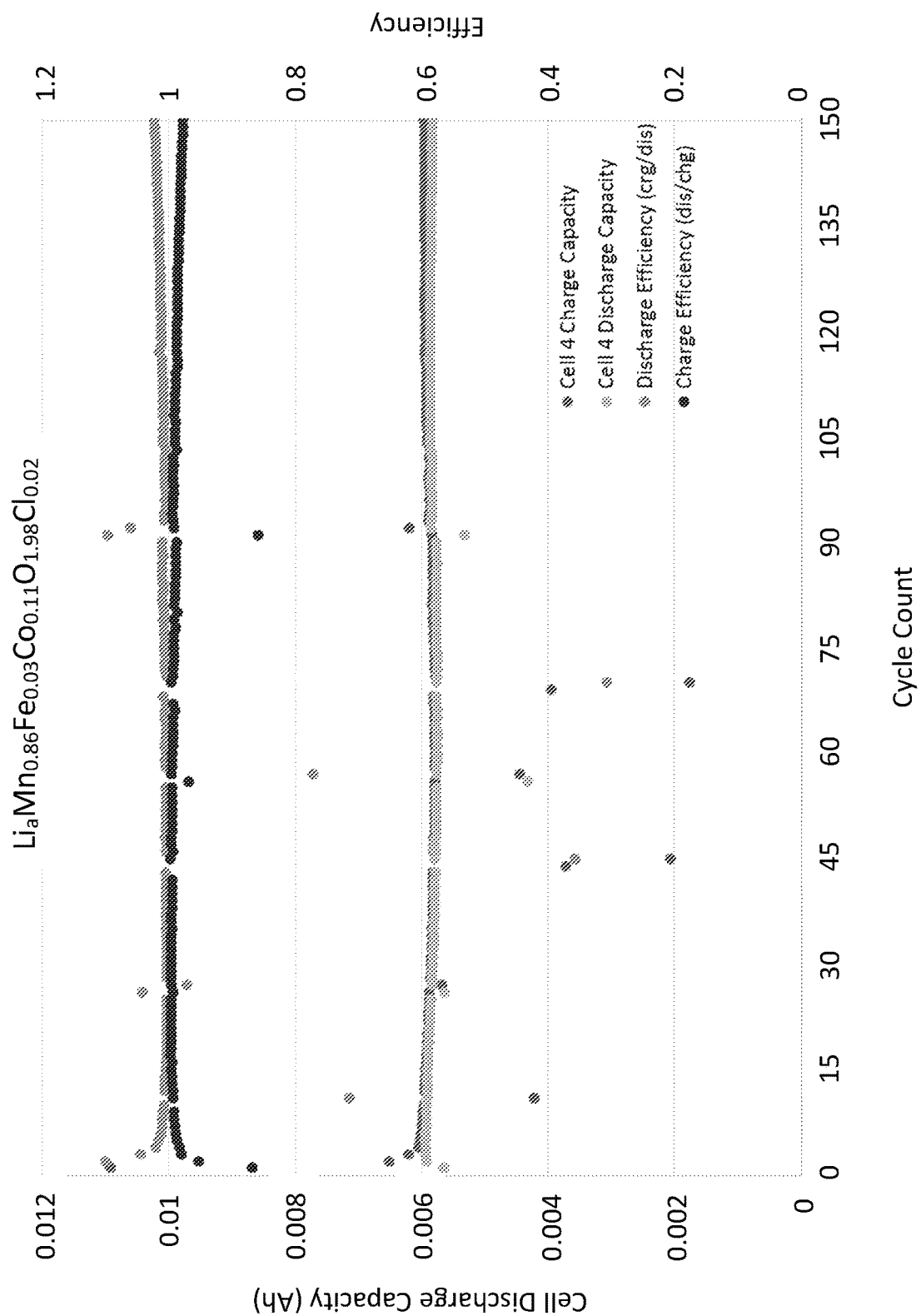

FIG. 22 shows exemplary coulombic efficiency plots for lithium electrochemical cells 1-4, which were fabricated with an exemplary formulation mixture.

Figure 23:
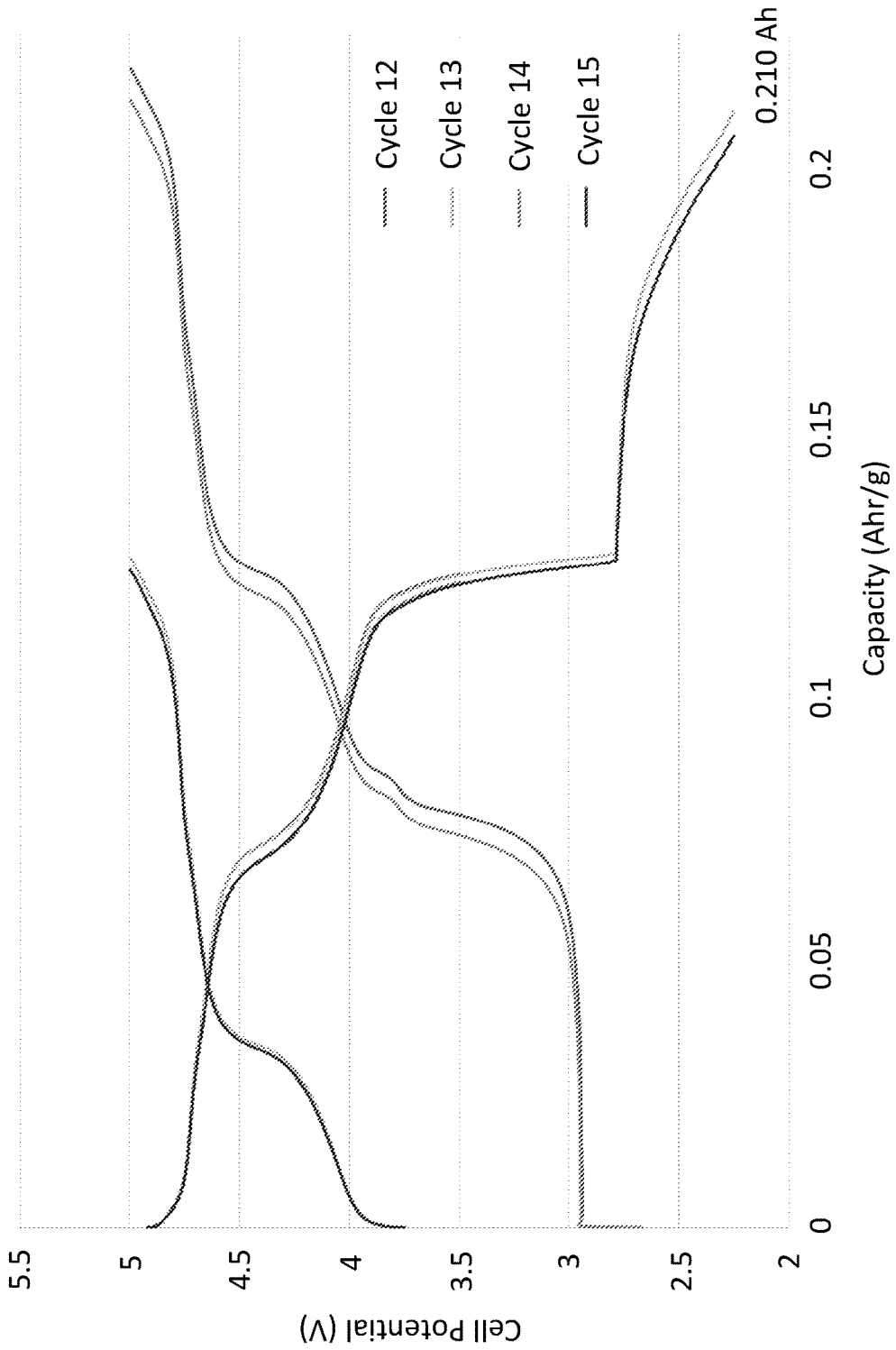

FIG. 23 is a graph illustrating cell potential (V) as a function of capacity (Ahr/g) for cycles 12-15 for a lithium cell containing an exemplary formulation mixture according to an exemplary embodiment of the present disclosure.

Figure 24:
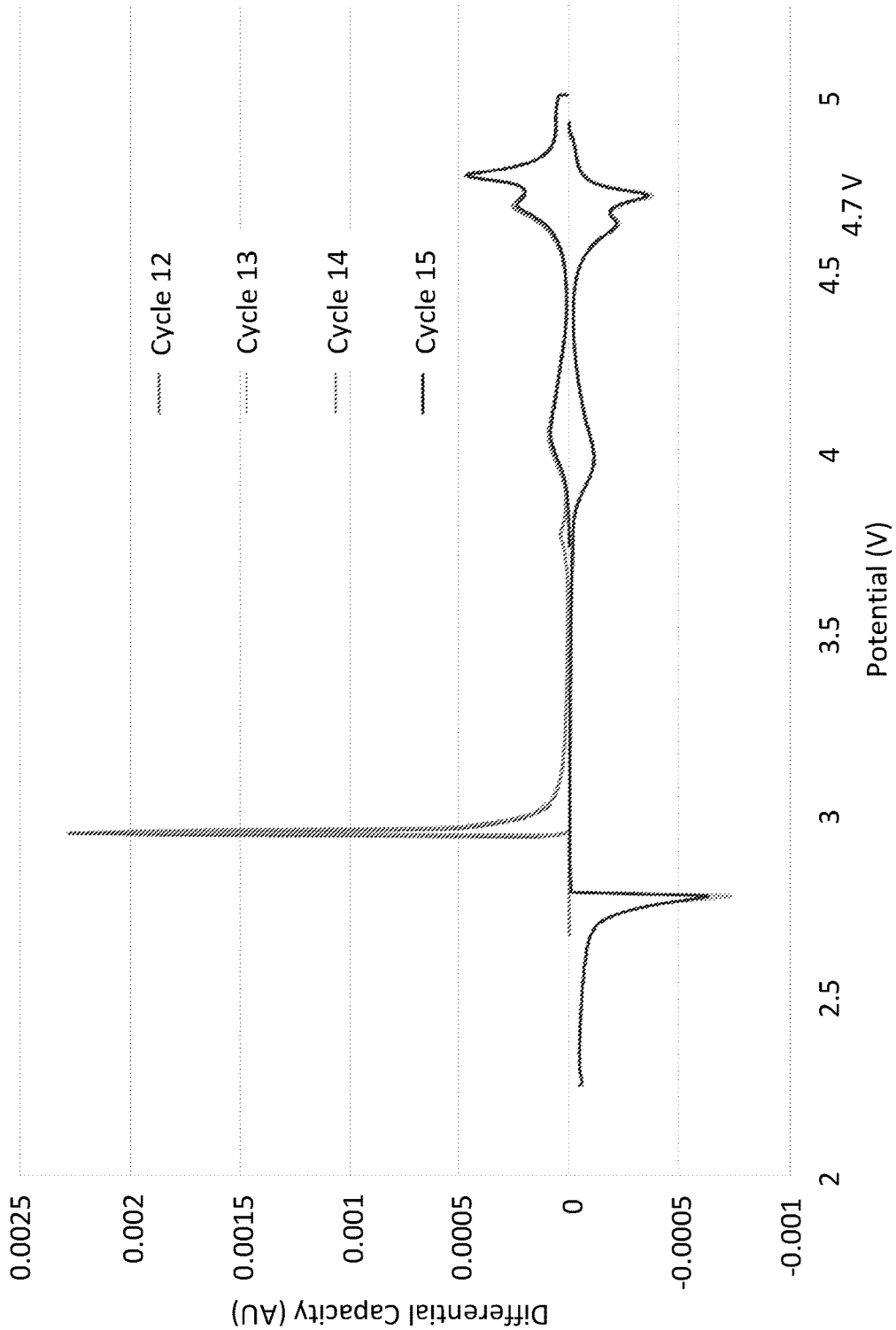

FIG. 24 is a differential capacity graph illustrating cycle traces 12-15 for a lithium cell containing an exemplary formulation mixture according to an exemplary embodiment of the present disclosure.

Figure 25:
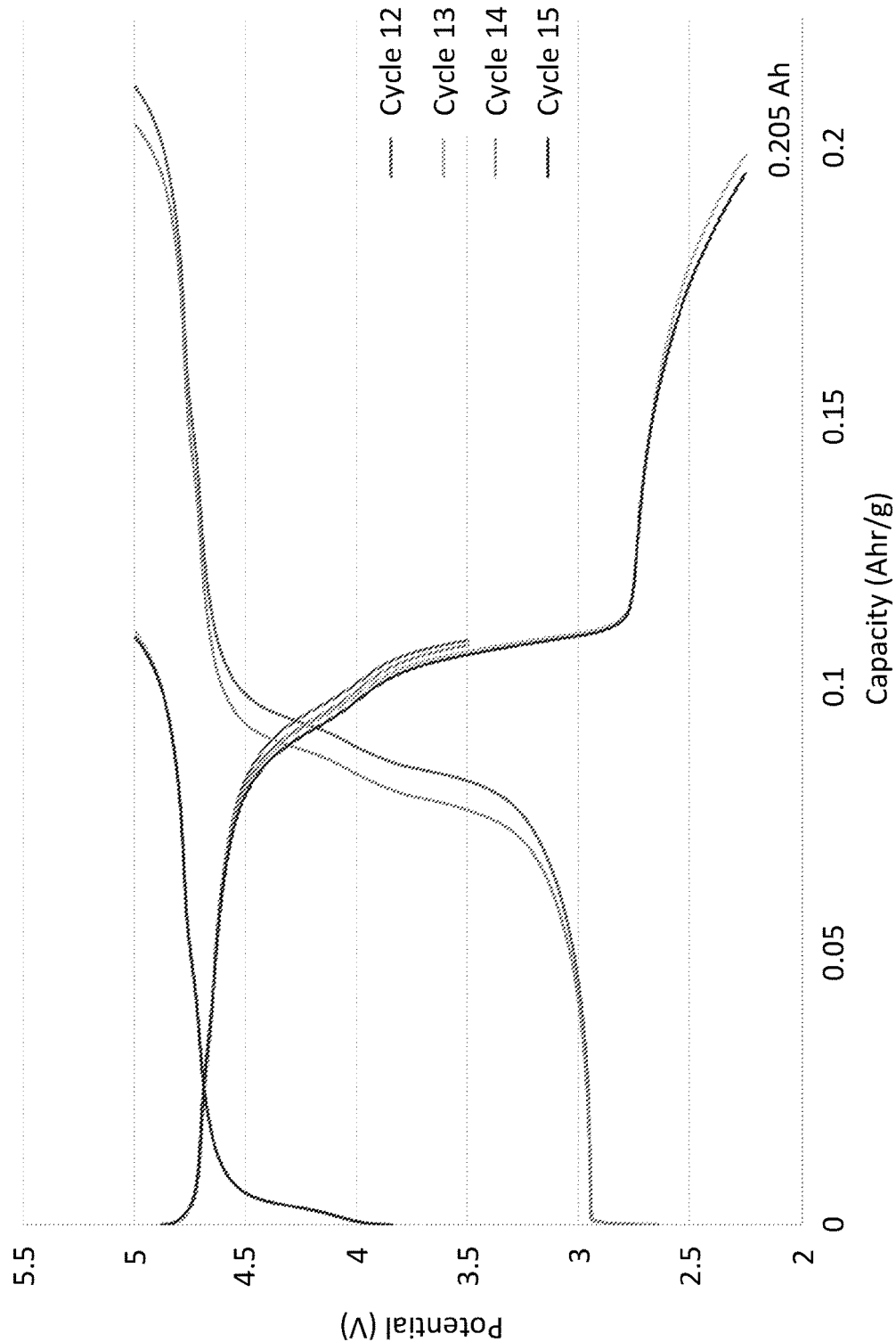

FIG. 25 is a graph illustrating cell potential (V) as a function of capacity (Ahr/g) for cycles 12-15 for a lithium cell containing an exemplary formulation mixture according to an exemplary embodiment of the present disclosure.

Figure 26:
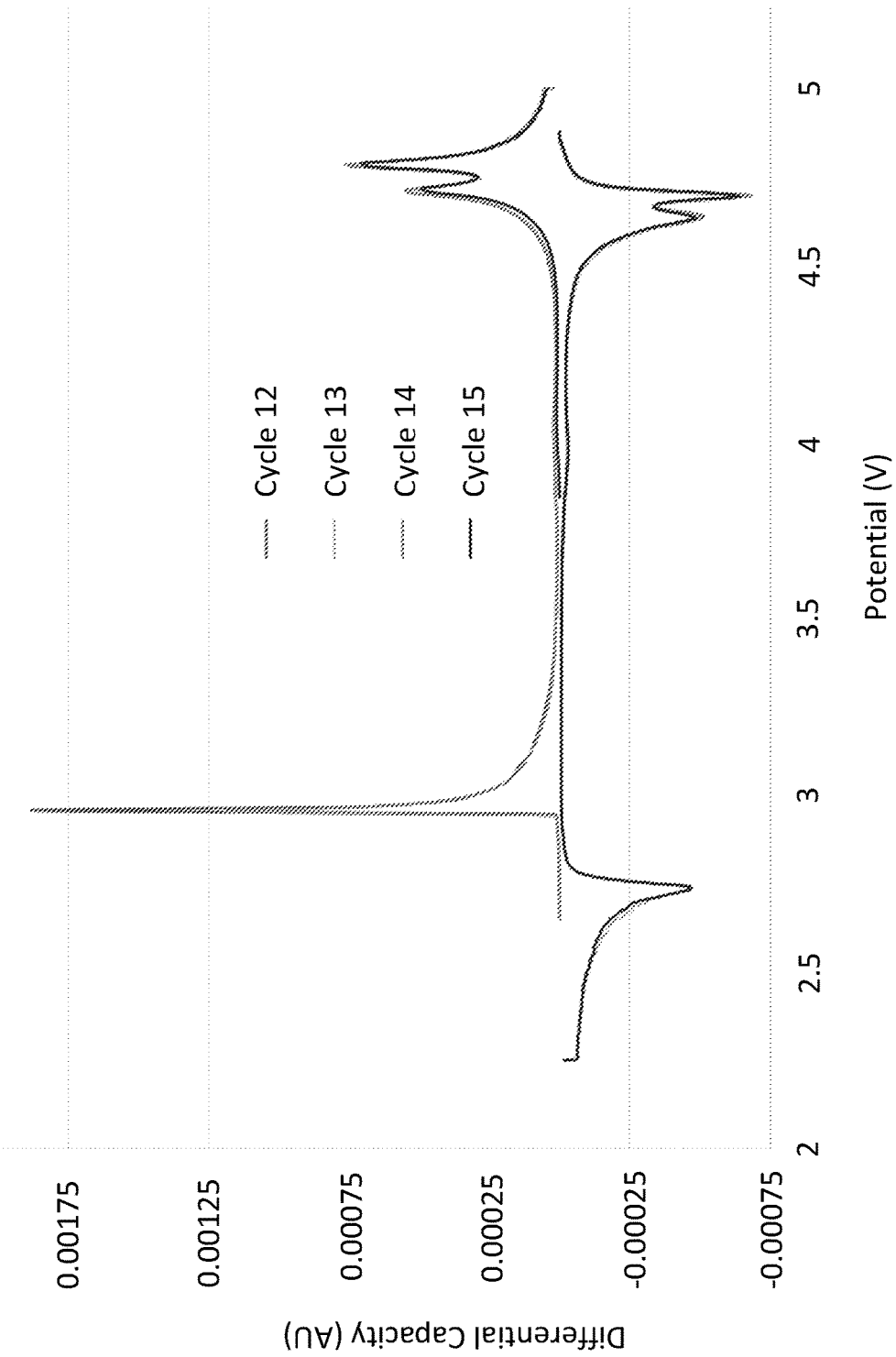

FIG. 26 is a differential capacity graph illustrating cycle traces 12-15 for a lithium cell containing an exemplary formulation mixture according to an exemplary embodiment of the present disclosure.

Figure 27:
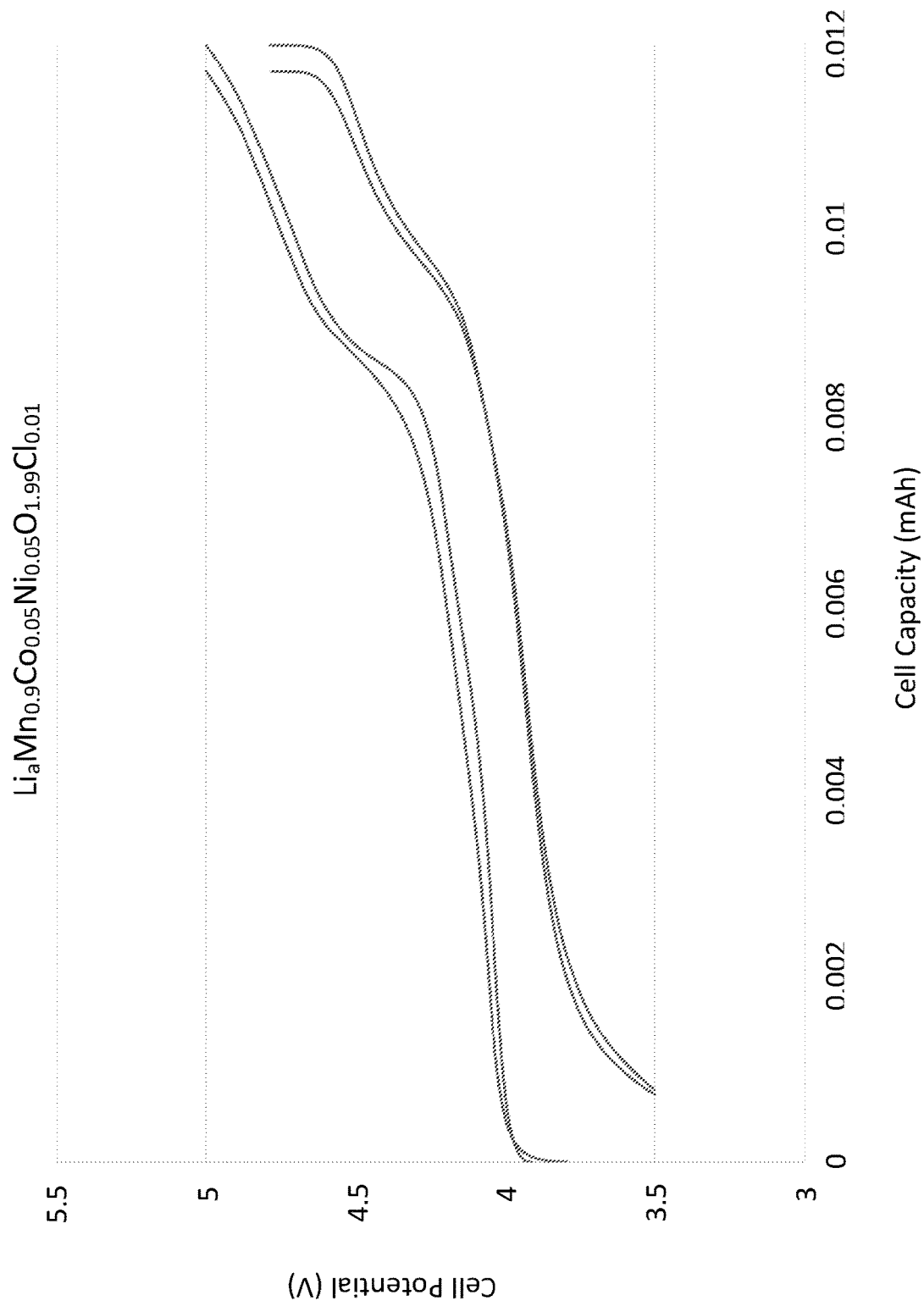

FIG. 27 is a plot containing the initial two charge/discharge cycle potential trace, the charge capacity and delivered discharge capacity per cycle of an exemplary lithium cell containing an exemplary formulation mixture according to an exemplary embodiment of the present disclosure.

Figure 28:
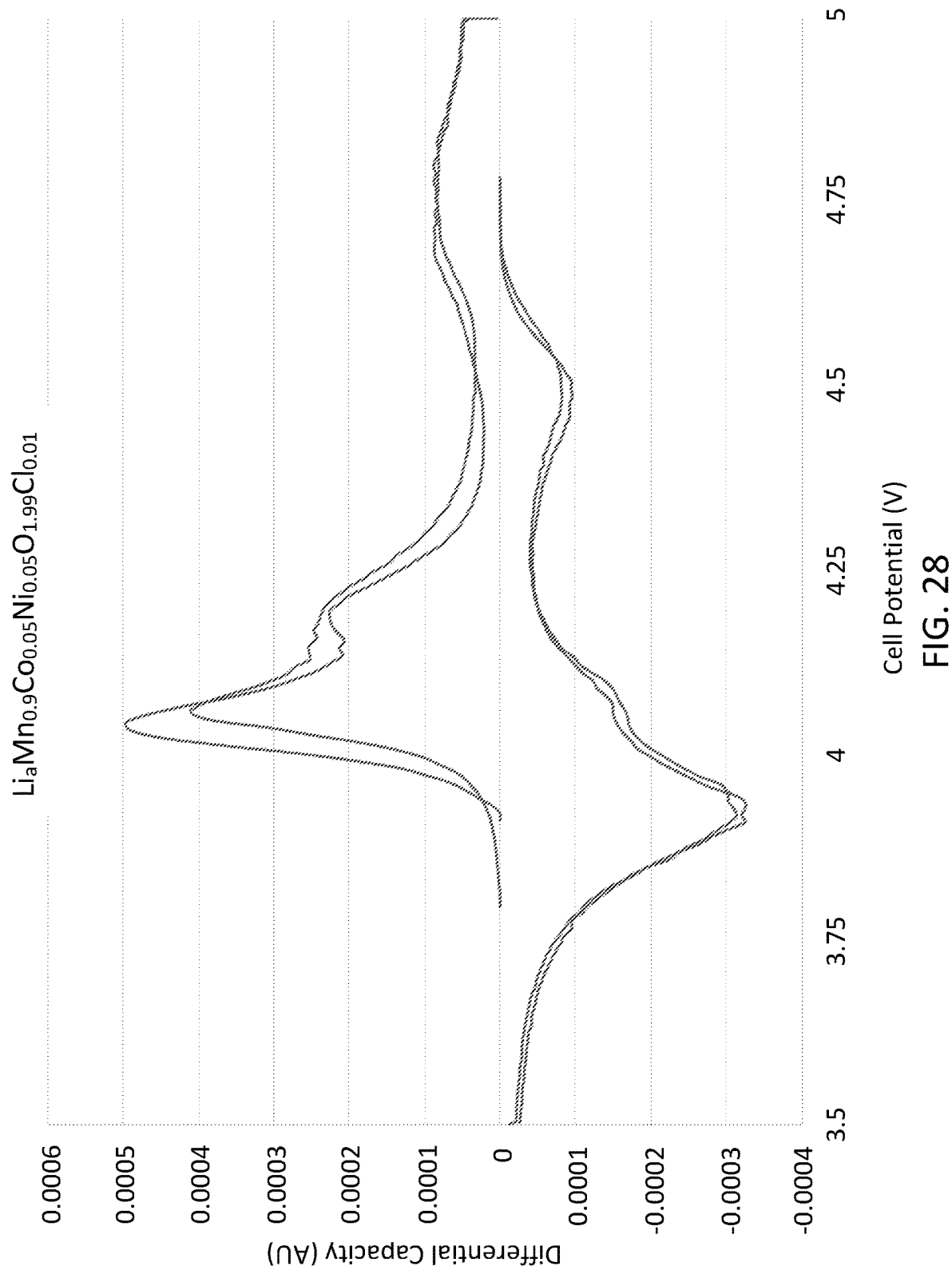

FIG. 28 is a differential capacity graph illustrating charge/discharge cycle traces for a lithium cell containing an exemplary formulation mixture according to an exemplary embodiment of the present disclosure.

DETAILED DESCRIPTION

Figure 1:
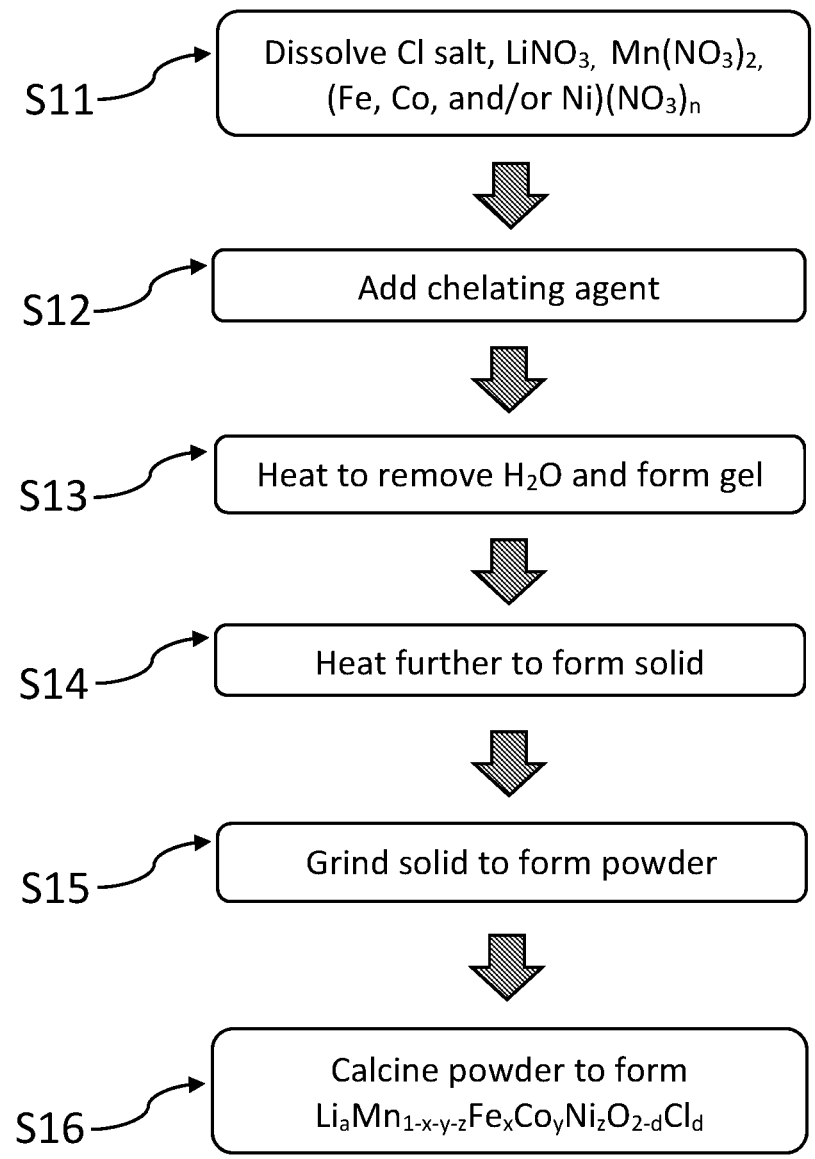
FIG. 1 is a flowchart illustrating process steps in an exemplary embodiment of the present disclosure, which yields a homogeneously dispersed Li$_a$Mn$_{1-x-y-z}$Fe$_x$-

FIGS. 1-2 are flowcharts illustrating process steps of exemplary embodiments of the present disclosure. More specifically, FIGS. 1-2 show exemplary steps according to the present disclosure for the preparation of a homogeneously dispersed $Li_aMn_{1-x-y-z}Fe_xCo_yNi_zO_{2-d}Cl_d$ lithium manganese-based lambda-MnO$_2$ ($\lambda$-MnO$_2$). The stoichiometric ratio in the final product is $Li_aMn_{1-x-y-z}Fe_xCo_yNi_zO_{2-d}Cl_d$, where a ranges from 0.025 to 0.975, from 0.2 to 0.75, or from 0.35 to 0.6; x ranges from 0.0 to 0.4, from 0.0 to 0.35, or from 0.0 to 0.3; y ranges from 0.0 to 0.4, from 0.0 to 0.35, or from 0.0 to 0.3; z ranges from 0.0 to 0.4, from 0.0 to 0.35, or from 0.0 to 0.3; x+y+z ranges from 0.005 to 0.45, from 0.01 to 0.4, or from 0.2 to 0.35; and d ranges from 0.001 to 0.125, from 0.015 to 0.1, or from 0.03 to 0.05. Additionally, x+y is greater than zero, y+z is greater than zero, and x+z is greater than zero. The reversible region for a $Li/Li_aMn_{1-x-y-z}Fe_xCo_yNi_zO_{2-d}Cl_d$ electrochemical couple has a voltage range between 5.3 V and 2.0 V.

Alternatively, the stoichiometric ratio in the final product is $Li_aMn_{1-x-y-z}Fe_xCo_yNi_zO_{2-d}Cl_d$, where a ranges from 0.025 to 0.975, from 0.2 to 0.75, or from 0.35 to 0.6; x ranges from 0.0025 to 0.4, from 0.0025 to 0.35, or from 0.0025 to 0.3; y ranges from 0.0025 to 0.4, from 0.0025 to 0.35, or from 0.0025 to 0.3; z ranges from 0.0025 to 0.4, from 0.0025 to 0.35, or from 0.0025 to 0.3; x+y+z ranges from 0.0075 to 0.45, from 0.01 to 0.4, or from 0.2 to 0.35; and d ranges from 0.001 to 0.125, from 0.015 to 0.1, or from 0.03 to 0.05. Here, Fe, Co, and Ni are all present in the final product. The reversible region for a $Li/Li_aMn_{1-x-y-z}Fe_xCo_yNi_zO_{2-d}Cl_d$ electrochemical couple has a voltage range between 5.3 V and 2.0 V.

The present $Li/Li_aMn_{1-x-y-z}Fe_xCo_yNi_zO_{2-d}Cl_d$ couple when configured as an electrochemical cell, exhibits increased discharge capacity and resilient enhanced overcharge behavior that allows the cathode to be fully reversible at elevated charge potentials and over-discharge tolerance allowing for decreased discharge potentials. Thus, the present $Li/Li_aMn_{1-x-y-z}Fe_xCo_yNi_zO_{2-d}Cl_d$ electrochemical cells produce the required reversibility and meet other significant lithium battery operational objectives (e.g., low impedance and thermal stability). In addition, the cycle and calendar life of the lithium cells fabricated using the present modified $\lambda$-MnO$_2$ material are significantly extended when compared to cells fabricated using conventional lithium manganese-based materials. The Group VIII Period 4 element (iron, cobalt, and nickel) and chlorine modified lithium manganese-based ($\lambda$-MnO$_2$) cathode material $Li_aMn_{1-x-y-z}Fe_xCo_yNi_zO_{2-d}Cl_d$ allows for over-discharge protection. Reversibility in the material is maintained after cell potential excursions less than 2.0 V are performed. When the Group VIII Period 4 element and chlorine modified lithium manganese-based ($\lambda$-MnO$_2$) $Li_aMn_{1-x-y-z}Fe_xCo_yNi_zO_{2-d}Cl_d$ cathode material is coupled with a lithium anode, it successfully cycles between 5.2 V and 2.0 V without significant degradation.

FIG. 1 is a flowchart illustrating process steps in an exemplary embodiment of the present disclosure. In Step S11, a chlorine containing salt is mixed with lithium nitrate; manganese nitrate; and either iron nitrate, cobalt nitrate, or nickel nitrate (or a mixture of some or all of these three compounds). The mixture is dissolved in a liquid to form a solution. Suitable chlorine containing salts include, but are not limited to, lithium chloride, manganese chloride, iron chloride, cobalt chloride, and nickel chloride. The compounds listed in Step S11 may be mixed in metal-based stoichiometric ratio.

In Step S12, a chelating agent is added to the solution. Suitable chelating agents include, but are not limited to, glycine, cellulose, citric acid, a cellulose-citric acid mixture, and urea. In Step S13, the solution is heated until water evaporates and a gel is formed. Heating may be accomplished on a hot plate or on any other surface conventionally used for heating. In Step S14, the gel is heated further until a solid is formed. In Step S15, the solid is ground. Grinding may be accomplished using conventional methods, such as using a mortar and pestle. In Step S16, the ground solid is calcined using conventional means, such as by using a furnace.

In one exemplary aspect of this embodiment, the preparation of the homogeneously dispersed $Li_aMn_{1-x-y-z}Fe_xCo_yNi_zO_{2-d}Cl_d$ lithium manganese-based lambda-MnO$_2$ ($\lambda$-MnO$_2$) material is accomplished via a method comprising a transesterification polymerization process followed by a calcining reaction. In this exemplary aspect, the liquid identified in Step S11 is an alcohol. Suitable alcohols include, but are not limited to, ethanol, propanol, isopropanol, and butanol. In this exemplary aspect, a transesterification initiator is dissolved into the solution after addition of the chelating agent. Suitable transesterification initiators include, but are not limited to, ethylene glycol, trimethylene glycol and tetraethylene glycol.

In this exemplary aspect, the solid that is formed in Step S14 is a polymeric solid. In Step S16, the polymeric solid is calcined at 650° C. for 10 hours. Alternatively, suitable calcination temperatures and times range from 350° C. to 800° C. (for 1 to 12 hours), 350° C. to 700° C. (for 8 to 12 hours), and 600° C. to 700° C. (for 9 to 12 hours).

In another exemplary aspect of the embodiment, the preparation of the homogeneously dispersed $Li_aMn_{1-x-y-z}Fe_xCo_yNi_zO_{2-d}Cl_d$ lithium manganese-based lambda-MnO$_2$ ($\lambda$-MnO$_2$) material is accomplished via a method comprising an initial nitrate flame process followed by a calcining reaction. In this exemplary aspect, the liquid identified in Step S11 is water, and the solid that is formed in Step S14 is an ash. Auto ignition may occur prior to or concomitantly with ash formation. In Step S16, the ash is calcined at 600° C. for 2 hours. Alternatively, suitable calcination temperatures and times range from 350° C. to 800° C. (for 1 to 4 hours), from 400° C. to 600° C. (for 1.5 to 3 hours), or from 500° C. to 600° C. (for 2 to 2.5 hours).

FIG. 2 is a flowchart illustrating process steps in an exemplary embodiment of the present disclosure. More specifically, FIG. 2 shows exemplary steps according to the present disclosure for the preparation of homogeneously dispersed $Li_aMn_{1-x-y-z}Fe_xCo_yNi_zO_{2-d}Cl_d$, where an intermediate manganese mixed metal based metal oxide is formulated through a hydrothermal process. This is followed by the addition of chemical salts introducing both lithium and chlorine to the reactants, a grinding process, and a calcining process. The lithium and chlorine additions are performed in the solid state.

In Step S21 of FIG. 2, manganese acetate and either iron acetate, cobalt acetate, or nickel acetate (or a mixture of two or all three of these) are dissolved in water. Suitable substitutes for manganese acetate include, but are not limited to, manganese carbonate, manganese sulfate, and manganese sulfite. Suitable substitutes for iron acetate include, but are not limited to, iron carbonate, iron sulfate, and iron sulfite. Suitable substitutes for cobalt acetate include, but are not limited to, cobalt carbonate, cobalt sulfate, and cobalt sulfite. Suitable substitutes for nickel acetate include, but are not limited to, nickel carbonate, nickel sulfate, and nickel sulfite. Reagents may be mixed together in metal based stoichiometric ratio; water may be distilled water. In Step S22, ammonium hydroxide is added to the aqueous metal acetate solution to form a gel. Suitable substitutes for ammonium hydroxide include, but are not limited to, hydrogen peroxide and organic hydroxides such as tetrabutylammonium hydroxide. In Step S23, the gel is dried to form a residual. Drying may be accomplished by heating or by other conventional drying means. In Step S24, the residual is heated until the material self-ignites to form a residual oxide. Decomposition may occur prior to or concomitantly with self-ignition. In Step S25 the residual oxide is ground. Grinding may be accomplished using conventional methods, such as using a mortar and pestle or a mixer mill. In Step S26, the ground residual oxide is calcined at 400° C. for 2 hours to form a manganese based mixed metal oxide. Calcining may be accomplished in air. Alternate calcination times and temperatures include 250° C.-600° C. for 1 hour to 8 hours; 350° C.-600° C. for 1 hour to 3.5 hours and 350° C.-450° C. for 1.5 hours to 3.5 hours. Step S26 is performed to ensure conversion of the starting materials into $Mn_{1-x-y-z}Fe_xCo_yNi_zO_n$. With calcination, a conversion rate of 98% is typical.

In Step S27 of FIG. 2, the resultant manganese based mixed metal oxide from Step S26 is mixed with lithium perchlorate and either lithium carbonate, lithium hydroxide, lithium oxide, or lithium peroxide (or a mixture of some or all of these four compounds). Suitable substitutes for lithium perchlorate include lithium chloride and lithium trichloroacetate. In Step S27, the stoichiometric ratio of the lithium salts determines the lithium and chlorine content of the final product. In Step S28, the mixture is ground. Grinding may be accomplished using conventional methods, such as using a mortar and pestle or a mixer mill. The ground mixture from Step S28 is then calcined in Step S29 at 600° C. for 4 hours. Calcining may take place in a furnace. Alternatively, suitable calcination temperatures and times range from 400° C. to 1200° C. for 4 to 96 hours, from 400° C. to 800° C. (for 4 to 48 hours), and from 500° C. to 700° C. (for 4 to 8 hours).

The exemplary processes described in the flowcharts depicted in FIGS. 1 and 2 illustrate the process steps in exemplary embodiments of the present disclosure. The resulting processes yield a metal site and chlorine "O" site modified lithium manganese-based lambda-$MnO_2$ ($\lambda$-$MnO_2$) material with a stoichiometric ratio of $Li_aMn_{1-x-y-z}Fe_xCo_yNi_zO_{2-d}Cl_d$, where a ranges from 0.025 to 0.975, from 0.2 to 0.75, or from 0.35 to 0.6; x ranges from 0.0 to 0.4, from 0.0 to 0.35, or from 0.0 to 0.3; y ranges from 0.0 to 0.4, from 0.0 to 0.35, or from 0.0 to 0.3; z ranges from 0.0 to 0.4, from 0.0 to 0.35, or from 0.0 to 0.3; x+y+z ranges from 0.005 to 0.45, from 0.01 to 0.4, or from 0.2 to 0.35; and d ranges from 0.001 to 0.125, from 0.015 to 0.1, or from 0.03 to 0.05. Additionally, x+y is greater than zero, y+z is greater than zero, and x+z is greater than zero. The reversible region for a $Li/Li_aMn_{1-x-y-z}Fe_xCo_yNi_zO_{2-d}Cl_d$ electrochemical couple has a voltage range between 5.3 V and 2.0 V. Alternatively, the stoichiometric ratio in the final product is $Li_aMn_{1-x-y-z}Fe_xCo_yNi_zO_{2-d}Cl_d$, where a ranges from 0.025 to 0.975, from 0.2 to 0.75, or from 0.35 to 0.6; x ranges from 0.0025 to 0.4, from 0.0025 to 0.35, or from 0.0025 to 0.3; y ranges from 0.0025 to 0.4, from 0.0025 to 0.35, or from 0.0025 to 0.3; z ranges from 0.0025 to 0.4, from 0.0025 to 0.35, or from 0.0025 to 0.3; x+y+z ranges from 0.0075 to 0.45, from 0.01 to 0.4, or from 0.2 to 0.35; and d ranges from 0.001 to 0.125, from 0.015 to 0.1, or from 0.03 to 0.05. Here, Fe, Co, and Ni are all present in the final product. The reversible region for a $Li/Li_aMn_{1-x-y-z}Fe_xCo_yNi_zO_{2-d}Cl_d$ electrochemical couple has a voltage range between 5.3 V and 2.0 V.

FIG. 3 shows the x-ray diffraction pattern of an exemplary formulation mixture according to exemplary embodiments of the present disclosure compared to standard data for intensity and location from the International Center for Diffraction Data for $LiMn_2O_4$ spinel. The material was prepared using the transesterification process followed by calcining described in the first embodiment of FIG. 1.

FIG. 4 shows the x-ray fluorescence pattern for an exemplary formulation mixture of the present disclosure. Included in FIG. 4 is the data of the final $Li_aMn_{0.925}Fe_{0.025}Co_{0.025}Ni_{0.025}O_{2-d}Cl_d$ material as well as intensity verses x-ray energy level for the system components. These components include the palladium x-ray source and silicon and phosphorus from the sample holder. The material was prepared using the transesterification process followed by calcining described in the first embodiment of FIG. 1.

In order to evaluate the electrochemical properties of the present Group VIII Period 4 element (iron, cobalt, and nickel) metal site and chlorine "O" site modified lithium manganese-based $\lambda$-$MnO_2$ cathode material in an electrochemical system, laboratory coin cells were fabricated using methods described in detail below. Experimental cells may also be fabricated using other methods known in the art, incorporating the $Li_aMn_{1-x-y-z}Fe_xCo_yNi_zO_{2-d}Cl_d$ lithium manganese-based $\lambda$-$MnO_2$ material described in the present disclosure. The experimental cells were composed of a lithium anode separated from a polytetrafluoroethylene (commercially available under the trade name TEFLON™, manufactured by DuPont) bonded cathode with a nonwoven glass separator. Other suitable anode materials include, but are not limited to, lithium metal, lithium aluminum alloy, lithium silicon alloy, graphite and graphite derivatives, tin oxide, and lithium phosphate. The cathode was fabricated by combining $Li_aMn_{1-x-y-z}Fe_xCo_yNi_zO_{2-d}Cl_d$, carbon, and TEFLON' in a 75:15:10 weight percent basis, respectively. Suitable conductive carbon materials include, but are not limited to, conductive carbon black (commercially available from various sources, including Cabot Corporation, under the trade name VULCAN XC72™ or VULCAN XC72R™), graphite, carbon nanofibers, and carbon nanoparticles (commercially available under the trade name PURE BLACK™, manufactured by Superior Graphite Co.). Suitable binders include, but are not limited to, polytetrafluoroethylene, polyvinylidene fluoride (PVDF), and latex. The cathode may contain by weight 40%-95% of $Li_aMn_{1-x-y-z}Fe_xCo_yNi_zO_{2-d}Cl_d$, 1%-40% of conductive carbon, and 1%-20% binder.

The cathode mix was rolled to 0.06 cm and dried in a vacuum oven. The cathode mass was approximately 0.1 g. The cathode and 0.075 cm thick lithium foil was cut using a 1.58 cm diameter (1.96 cm²) hole punch. A 0.01 cm nonwoven glass separator was used for the separator and as a wick. The electrolyte used was 1 M $LiPF_6$ in proportional mixtures of dimethyl carbonate and ethylene carbonate. Other suitable electrolytes include, but are not limited to, lithium hexafluoroarsenate monohydrate ($LiAsF_6$), lithium perchlorate ($LiClO_4$), lithium tetrafluoroborate ($LiBF_4$), and lithium triflate ($LiCF_3SO_3$). The cells were cycled with an ARBIN Model MSTAT4 Battery Test System. The charge profile consisted of a constant current charge at 1.0 or 2.0 mA to 4.5 V, 4.75 V, 5.0 V or 5.2 V. The cells were discharged at 1.0 or 2.0 mA to 2.0 V, 2.25 V or 3.5 V. A rest period of 15 minutes between cycles allowed for the cells to equilibrate. Prior to cycling, cell impedance was recorded with a Solartron, SI1260 Frequency Response Analyzer with a Solartron, SI1287 Electrochemical Interface using Scribner Associates, Inc., ZPlot and ZView software. The data is used as a quality control tool and for comparative use between variant chemistries.

The data shows stable Group VIII Period 4 element (iron, cobalt, and nickel) metal site and chlorine "O" site modified lithium manganese-based λ-MnO$_2$ cathode material was formulated, fabricated, and characterized as a positive electrode suitable for lithium and lithium ion rechargeable electrochemical cells and batteries. The general formula for the present material is Li$_a$Mn$_{1-x-y-z}$Fe$_x$Co$_y$Ni$_z$O$_{2-d}$Cl$_d$. The stoichiometric ratio in the final product is Li$_a$Mn$_{1-x-y-z}$Fe$_x$Co$_y$Ni$_z$O$_{2-d}$Cl$_d$, where a ranges from 0.025 to 0.975, from 0.2 to 0.75, or from 0.35 to 0.6; x ranges from 0.0 to 0.4, from 0.0 to 0.35, or from 0.0 to 0.3; y ranges from 0.0 to 0.4, from 0.0 to 0.35, or from 0.0 to 0.3; z ranges from 0.0 to 0.4, from 0.0 to 0.35, or from 0.0 to 0.3; x+y+z ranges from 0.005 to 0.45, from 0.01 to 0.4, or from 0.2 to 0.35; and d ranges from 0.001 to 0.125, from 0.015 to 0.1, or from 0.03 to 0.05. Additionally, x+y is greater than zero, y+z is greater than zero, and x+z is greater than zero. The reversible region for a Li/Li$_a$Mn$_{1-x-y-z}$Fe$_x$Co$_y$Ni$_z$O$_{2-d}$Cl$_d$ electrochemical couple has a voltage range between 5.3 V and 2.0 V.

Alternatively, the stoichiometric ratio in the final product is Li$_a$Mn$_{1-x-y-z}$Fe$_x$Co$_y$Ni$_z$O$_{2-d}$Cl$_d$, where a ranges from 0.025 to 0.975, from 0.2 to 0.75, or from 0.35 to 0.6; x ranges from 0.0025 to 0.4, from 0.0025 to 0.35, or from 0.0025 to 0.3; y ranges from 0.0025 to 0.4, from 0.0025 to 0.35, or from 0.0025 to 0.3; z ranges from 0.0025 to 0.4, from 0.0025 to 0.35, or from 0.0025 to 0.3; x+y+z ranges from 0.0075 to 0.45, from 0.01 to 0.4, or from 0.2 to 0.35; and d ranges from 0.001 to 0.125, from 0.015 to 0.1, or from 0.03 to 0.05. Here, Fe, Co, and Ni are all present in the final product. The reversible region for a Li/Li$_a$Mn$_{1-x-y-z}$Fe$_x$Co$_y$Ni$_z$O$_{2-d}$Cl$_d$ electrochemical couple has a voltage range between 5.3 V and 2.0 V. The specific capacity for the Group VIII Period 4 element (iron, cobalt, and nickel) metal site and chlorine "O" site modified lithium manganese-based λ-MnO$_2$ cathode material ranged from 100 to 125 mAh/g when coupled with lithium and cycled between 5.2 V and 3.5 V. This is comparable to conventional lithium manganese-based cathode materials fabricated over a 48 to 72-hour time span. Processing time according to the present disclosure can be reduced to less than 8 hours. The specific capacity for the Group VIII Period 4 element (iron, cobalt, and nickel) metal site and chlorine "O" site modified lithium manganese-based λ-MnO$_2$ cathode material was 195 to 205 mAh/g when coupled with lithium and cycled between 5.2 V and 2.0 V. Li/Li$_a$Mn$_{1-x-y-z}$Fe$_x$Co$_y$Ni$_z$O$_{2-d}$Cl$_d$ cells cycled between 4.5 V and 3.5 V maintained greater than 95% of their original capacity through 200 cycles.

FIG. 5 shows the potential verses time data along with the discharge capacity per cycle for the first twenty cycles. The graph clearly shows the increase in available capacity as the charge termination voltage is increased from 4.5 volts to 5.25 volts. This material was prepared according to the transesterification process followed by calcining, as described in the first embodiment of FIG. 1.

FIG. 6 is a differential capacity graph of the sixteenth cycle illustrating thermodynamics of lithium cells containing Group VIII Period 4 element (iron, cobalt, and nickel) metal site and chlorine "O" site modified lithium manganese-based λ-MnO$_2$ cathode material according to an exemplary embodiment of the present disclosure using the transesterification polymerization process and calcining method. The differential capacity data uses galvanostatic control of the electrochemical system being tested, and plots the capacity increase (charge) or decrease (discharge) as a function of potential. FIG. 6 shows the stable thermodynamic behavior of the Group VIII Period 4 element (iron, cobalt, and nickel) metal site and chlorine "O" site modified lithium manganese-based λ-MnO$_2$ cathode material according to an exemplary embodiment of the present disclosure, where Li$_a$Mn$_{0.925}$Fe$_{0.025}$Co$_{0.025}$Ni$_{0.025}$O$_{2-d}$Cl$_d$ is the active cathode material and lithium is the active anode material.

FIG. 7 shows exemplary initial three charge/discharge cycle plots for lithium electrochemical cells fabricated with Group VIII Period 4 element (iron, cobalt, and nickel) metal site and chlorine "O" site modified lithium manganese-based λ-MnO$_2$ cathode material, synthesized using the transesterification polymerization process and calcining method described in the present disclosure. There is a noticeable overcharge during the first cycle. This is due to gelling of the electrolyte at high voltages. For this graph, the composition is Li$_a$Mn$_{0.95}$Fe$_{0.025}$Co$_{0.025}$O$_{2-d}$Cl$_d$. This material was prepared according to the transesterification process followed by calcining, as described in the first embodiment of FIG. 1.

FIG. 8 shows exemplary initial differential capacity plots for lithium electrochemical cells fabricated with Group VIII Period 4 element (iron, cobalt, and nickel) metal site and chlorine "O" site modified lithium manganese-based λ-MnO$_2$ cathode material, synthesized using the transesterification polymerization process and calcining method described in the present disclosure. During cycle one, there is an overcharge due to reaction with the electrolyte. The differential capacity at 5 V does not indicate additional overcharge due to reaction with the cell's electrolyte. This can be attributed to the electrolyte gelling as there is no evidence of discharge capacity loss on the initial cycle.

FIG. 9 shows the potential verses time data along with the charge capacity and delivered discharge capacity per cycle for the first ten cycles. The graph clearly shows the overcharge during the first cycle but both discharge and charge capacity recover with little effects on overall performance during the subsequent nine cycles. The overcharge can be attributed to electrolyte gelling in the first cycle due to the high voltage. The structure of the material is not adversely effected. This material was prepared according to the transesterification process followed by calcining, as described in the first embodiment of FIG. 1.

FIG. 10 is a differential capacity graph of the initial ten cycles illustrating exemplary cycle life traces for lithium cells containing Group VIII Period 4 element (iron, cobalt, and nickel) metal site and chlorine "O" site modified lithium manganese-based λ-MnO$_2$ cathode material according to an exemplary embodiment of the present disclosure using the transesterification polymerization process and calcining method. The differential capacity data uses galvanostatic control of the electrochemical system being tested, and plots the capacity increase (charge) or decrease (discharge) as a function of potential. FIG. 10 shows the stable thermodynamic behavior of the Group VIII Period 4 element (iron, cobalt, and nickel) metal site and chlorine "O" site modified lithium manganese-based λ-MnO$_2$ cathode material according to an exemplary embodiment of the present disclosure, where Li$_a$Mn$_{0.95}$Fe$_{0.025}$Co$_{0.025}$O$_{2-d}$Cl$_d$ is the active cathode material and lithium is the active anode material. Overcharge observed in the first cycle can be attributed to electrolyte gelling in the first cycle due to the high voltage. The structure of the material is not adversely effected.

FIG. 11 shows the potential verses time data along with the charge capacity and delivered discharge capacity per cycle for cycles 42-49. The graph clearly shows the rechargeability of the material all the way through cycle 49. The material clearly shows reversibility. The overcharge on cycle 41 is due to gelation of the electrolyte. The other cycles show no deformation or loss of performance due to the overcharge. This material was prepared according to the transesterification process followed by calcining, as described in the first embodiment of FIG. 1.

FIG. 12 is a differential capacity graph of cycle 39 through 49 illustrating exemplary cycle life traces for lithium cells containing Group VIII Period 4 element (iron, cobalt, and nickel) metal site and chlorine "O" site modified lithium manganese-based λ-$MnO_2$ cathode material according to an exemplary embodiment of the present disclosure using the transesterification polymerization process and calcining method. FIG. 12 shows the stable thermodynamic behavior of the Group VIII Period 4 element (iron, cobalt, and nickel) metal site and chlorine "O" site modified lithium manganese-based λ-$MnO_2$ cathode material according to an exemplary embodiment of the present disclosure, where $Li_aMn_{0.95}Fe_{0.025}Co_{0.025}O_{2-d}Cl_d$ is the active cathode material and lithium is the active anode material. The overcharge at cycle 41 shows slight changes during the charge but the discharge shows similar characteristics indicating the overcharge to be related to degradation of the electrolyte and not cathode degradation.

FIG. 13 shows exemplary initial cycle plots for lithium electrochemical cells fabricated with Group VIII Period 4 element (iron, cobalt, and nickel) metal site and chlorine "O" site modified lithium manganese-based λ-$MnO_2$ cathode material, synthesized using the transesterification polymerization process and calcining method described in the present disclosure. With a low dopant amount (specifically, where x=0.03, y=0.02, and z=0), the cathode material can withstand cycling between 5.25 V and 3.5 V without the standard forming cycle.

FIG. 14 is a differential capacity graph of cycles 1 through 3 illustrating exemplary cycle life traces for lithium cells containing Group VIII Period 4 element (iron, cobalt, and nickel) metal site and chlorine "O" site modified lithium manganese-based λ-$MnO_2$ cathode material according to an exemplary embodiment of the present disclosure using the transesterification polymerization process and calcining method. The differential capacity data uses galvanostatic control of the electrochemical system being tested, and plots the capacity increase (charge) or decrease (discharge) as a function of potential. The cycle life traces show the stable thermodynamic behavior of the Group VIII Period 4 element (iron, cobalt, and nickel) metal site and chlorine "O" site modified lithium manganese-based λ-$MnO_2$ cathode material according to an exemplary embodiment of the present disclosure, where $Li_aMn_{0.95}Fe_{0.03}Co_{0.02}O_{2-d}Cl_d$ is the active cathode material and lithium is the active anode material. Overcharge observed in the first cycle can be attributed to electrolyte gelling in the first cycle due to the high voltage. The structure of the material is not adversely effected, as demonstrated by the smooth charge and discharge cycles.

FIG. 15 is a graph showing the potential verses time data along with the charge capacity and delivered discharge capacity per cycle for cycles 4 through 12. The graph clearly shows the overcharge during the first cycle but both discharge and charge capacity recover with little effects on overall performance. This indicates that the first cycle involves gelling of the electrolyte due to the high voltage. The structure of the material is not adversely effected. This also shows that increased cobalt concentration (y=0.15) does not prevent the material from retaining its reversibility. This material was prepared according to the transesterification process followed by calcining, as described in the first embodiment of FIG. 1.

FIG. 16 is a differential capacity graph of cycles four through ten illustrating exemplary cycle life traces for lithium cells containing Group VIII Period 4 element (iron, cobalt, and nickel) metal site and chlorine "O" site modified lithium manganese-based λ-$MnO_2$ cathode material according to an exemplary embodiment of the present disclosure using the transesterification polymerization process and calcining method. The cycle life traces show the stable thermodynamic behavior of the Group VIII Period 4 element (iron, cobalt, and nickel) metal site and chlorine "O" site modified lithium manganese-based λ-$MnO_2$ cathode material according to an exemplary embodiment of the present disclosure, where $Li_aMn_{0.825}Fe_{0.025}Co_{0.15}O_{2-d}Cl_d$ is the active cathode material and lithium is the active anode material. The material has little capacity at low voltages of −3.9 V due to the increased concentration of cobalt. This demonstrates that the material can withstand higher cobalt concentrations (y=0.15) while maintaining its structure over the initial 10 cycles.

FIG. 17 is a graph showing exemplary cycle plots for lithium electrochemical cells fabricated with Group VIII Period 4 element (iron, cobalt, and nickel) metal site and chlorine "O" site modified lithium manganese-based λ-$MnO_2$ cathode material, synthesized using the nitrate flame process followed by calcining described in the second embodiment described in FIG. 1, where $Li_xMn_{0.945}Fe_{0.05}Co_{0.055}O_{2-d}Cl_d$ is the active cathode material and lithium is the active anode material. For this example the cell was charged to a potential of 4.5 V and discharged to a potential of 3.5 V for ten initial cycles. The graph indicates no loss of capacity when cycling between the aforementioned voltages.

FIG. 18 is a graph showing exemplary cycle plots for a lithium electrochemical cell fabricated with Group VIII Period 4 element (iron, cobalt, and nickel) metal site and chlorine "O" site modified lithium manganese-based λ-$MnO_2$ cathode material, synthesized using the nitrate flame process followed by calcining described in the second embodiment described in FIG. 1, where $Li_xMn_{0.945}Fe_{0.05}Co_{0.055}O_{2-d}Cl_d$ is the active cathode material and lithium is the active anode material. For this example, the cell was cycled between 4.5 V and 3.5 V for the initial ten cycles. For the next three cycles, the cell was cycled between 5.25 V and 3.5 V. The next three cycles included a deep discharge between 5.25 V and 2.25 V before returning to cycling between 5.25 V and 3.5 V. The cycle plots indicate no loss of capacity when cycling between the aforementioned voltages. When discharging deep, there is a 50% increase in capacity and the return to high voltage charging without the deep discharge indicates the material is reversible and does not undergo permanent structural deformation.

FIG. 19 is a graph showing cell potential (V) as a function of cell capacity (Ah) for cycles 12-28. The graph clearly shows the consistent voltage trace and minimal over potential, less than 0.2 V, achieved with the $Li_aMn_{1-x-y-z}Fe_xCo_yNi_zO_{2-d}Cl_d$ material of the present disclosure. This allows for both coulombic and energy efficient recharge of the resultant lithium or lithium ion cell. The material was prepared by the hydrothermal process, followed by the solid state addition of chemical salts and calcining, as described in FIG. 2.

FIG. 20 is a differential capacity graph of cycles 12 through 28 illustrating exemplary cycle life traces for lithium cells containing Group VIII Period 4 element (iron, cobalt, and nickel) metal site and chlorine "O" site modified lithium manganese-based λ-$MnO_2$ cathode material according to an exemplary embodiment of the present disclosure using the hydrothermal process, followed by the solid state addition of chemical salts and calcining, as described in FIG. 2. FIG. 20 shows the stable thermodynamic behavior of the Group VIII Period 4 element (iron, cobalt, and nickel) metal site and chlorine "O" site modified lithium manganese-based λ-MnO$_2$ cathode material according to an exemplary embodiment of the present disclosure, where Li$_a$Mn$_{0.86}$Fe$_{0.03}$Co$_{0.11}$O$_{1.98}$Cl$_{0.02}$ is the active cathode material and lithium is the active anode material.

FIGS. 21 and 22 show exemplary cycle life and coulombic efficiency plots for lithium electrochemical cells 1-4, which were fabricated with Group VIII Period 4 element (iron, cobalt, and nickel) metal site and chlorine "O" site modified lithium manganese-based λ-MnO$_2$ cathode material, synthesized using the hydrothermal process followed by the solid state addition of chemical salts and calcining, as described in FIG. 2. Li$_a$Mn$_{0.86}$Fe$_{0.03}$Co$_{0.11}$O$_{1.98}$Cl$_{0.02}$ is the active cathode material and lithium is the active anode material. For this example, each cell was charged to a potential of 4.5 V and discharged to a potential of 3.5 V. FIG. 21 shows the plot of cycle life data for representative cells beyond 200 cycles. The plot in FIG. 22 shows coulombic efficiency of a representative cell.

FIG. 23 shows exemplary cycle plots for lithium electrochemical cells fabricated with Group VIII Period 4 element (iron, cobalt, and nickel) metal site and chlorine "O" site modified lithium manganese-based λ-MnO$_2$ cathode material, synthesized using the hydrothermal process followed by the solid state addition of chemical salts and calcining, as described in FIG. 2, where Li$_a$Mn$_{0.77}$Fe$_{0.06}$Ni$_{0.17}$O$_{2-d}$Cl$_d$ is the active cathode material and lithium is the active anode material. For this example the cell was charged to a potential of 5.0 V and discharged to a potential of 3.5 V for cycles 12 and 13 before cycling to 5 V and discharging to 2.25 V. The graph indicates sustained efficiency and reversibility when performing a deep discharge to 2.25 V. When discharging deep, there is an increase in capacity.

FIG. 24 is a differential capacity graph of cycles 12-15, illustrating exemplary cycle life traces for lithium cells containing Group VIII Period 4 element (iron, cobalt, and nickel) metal site and chlorine "O" site modified lithium manganese-based λ-MnO$_2$ cathode material according to an exemplary embodiment of the present disclosure using the hydrothermal process, followed by the solid state addition of chemical salts and calcining, as described in FIG. 2. FIG. 24 shows the stable thermodynamic behavior of the Group VIII Period 4 element (iron, cobalt, and nickel) metal site and chlorine "O" site modified lithium manganese-based λ-MnO$_2$ cathode material according to an exemplary embodiment of the present disclosure, where Li$_a$Mn$_{0.77}$Fe$_{0.06}$Ni$_{0.17}$O$_{2-d}$Cl$_d$ is the active cathode material and lithium is the active anode material. As indicated by the traces, the cathode material was able to discharge to 2.25 V and charge back to 4.5 V without structural deformation.

FIG. 25 shows exemplary cycle plots for lithium electrochemical cells fabricated with Group VIII Period 4 element (iron, cobalt, and nickel) metal site and chlorine "O" site modified lithium manganese-based λ-MnO$_2$ cathode material, synthesized using the hydrothermal process, followed by the solid state addition of chemical salts and calcining as described in FIG. 2, where Li$_a$Mn$_{0.67}$Fe$_{0.04}$Ni$_{0.29}$O$_{2-d}$Cl$_d$ is the active cathode material and lithium is the active anode material. For this example the cell was charged to a potential of 5.0 V and discharged to a potential of 3.5 V for cycles 12 and 13 before cycling to 5 V and discharging to 2.25 V. The graph indicates sustained efficiency and reversibility when performing a deep discharge to 2.25 V. When discharging deep, there is a 50% increase in capacity.

FIG. 26 is a differential capacity graph of cycle twelve through fifteen illustrating exemplary cycle life traces for lithium cells containing Group VIII Period 4 element (iron, cobalt, and nickel) metal site and chlorine "O" site modified lithium manganese-based λ-MnO$_2$ cathode material according to an exemplary embodiment of the present disclosure using the hydrothermal process, followed by the solid state addition of chemical salts and calcining, as described in FIG. 2. The cycle life traces show the stable thermodynamic behavior of the Group VIII Period 4 element (iron, cobalt, and nickel) metal site and chlorine "O" site modified lithium manganese-based λ-MnO$_2$ cathode material according to an exemplary embodiment of the present disclosure, where Li$_a$Mn$_{0.67}$Fe$_{0.04}$Ni$_{0.29}$O$_{2-d}$Cl$_d$ is the active cathode material and lithium is the active anode material. As indicated by the traces, the cathode material was able to discharge to 2.25 V and charge back to 4.5 V without structural deformation.

FIG. 27 is a graph containing the initial two charge/discharge cycle potential trace, the charge capacity and delivered discharge capacity per cycle of an exemplary lithium cell containing Group VIII Period 4 element (iron, cobalt, and nickel) metal site and chlorine "0" site modified lithium manganese-based λ-MnO$_2$ cathode material according to an exemplary embodiment of the present disclosure. The cell data presented in FIG. 27 was obtained from a lithium electrochemical cell with Li$_a$Mn$_{0.9}$Co$_{0.05}$Ni$_{0.05}$O$_{1.99}$Cl$_{0.01}$ stoichiometry, using cathode material of the present disclosure prepared via a hydrothermal process, followed by the solid state addition of chemical salts and calcining as described in FIG. 2.

FIG. 28 is a differential capacity graph illustrating charge/discharge cycle traces for a lithium cell containing two Group VIII Period 4 element (iron, cobalt, and nickel) metal site and chlorine "O" site modified lithium manganese-based λ-MnO$_2$ cathode material according to an exemplary embodiment of the present disclosure. The cell data presented in FIG. 28 was obtained from a lithium electrochemical cell with Li$_a$Mn$_{0.9}$Co$_{0.05}$Ni$_{0.05}$O$_{1.99}$Cl$_{0.01}$ stoichiometry, using cathode material of present disclosure prepared via a hydrothermal process, followed by the solid state addition of chemical salts and calcining (described in FIG. 2).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A homogeneously dispersed cathode material, comprising a compound represented by the formula Li$_a$Mn$_{1-x-y-z}$Fe$_x$Co$_y$Ni$_z$O$_{2-d}$Cl$_d$, wherein a ranges from 0.025 to 0.975,
wherein d ranges from 0.001 to 0.125,
wherein x ranges from 0.0025 to 0.4,
wherein y ranges from 0.0025 to 0.4,
wherein z ranges from 0.0025 to 0.4, and
wherein the compound represented by the formula Li$_a$Mn$_{1-x-y-z}$Fe$_x$Co$_y$Ni$_z$O$_{2-d}$Cl$_d$ comprises iron, cobalt, and nickel.

2. The homogeneously dispersed cathode material according to claim 1, wherein x ranges from 0.0025 to 0.35.

3. The homogeneously dispersed cathode material according to claim 1,
wherein a reversible region for a Li/Li$_a$Mn$_{1-x-y-z}$Fe$_x$Co$_y$Ni$_z$O$_{2-d}$Cl$_d$ electrochemical couple ranges from 5.3 V to 2.0 V.

4. The homogeneously dispersed cathode material according to claim 1, wherein x+y+z ranges from 0.0075 to 0.45.

5. The homogeneously dispersed cathode material according to claim 4, wherein x+y+z ranges from 0.01 to 0.4.

6. The homogeneously dispersed cathode material according to claim 4, wherein y ranges from 0.0025 to 0.35.

7. The homogeneously dispersed cathode material according to claim 6, wherein z ranges from 0.0025 to 0.35.

8. A lithium electrochemical cell comprising:
an anode; and
a cathode comprising a cathode material, the cathode material further comprising a compound represented by the formula $Li_aMn_{1-x-y-z}Fe_xCo_yNi_zO_{2-d}Cl_d$,
wherein a ranges from 0.025 to 0.975, and
wherein d ranges from 0.001 to 0.125,
wherein x ranges from 0.0025 to 0.4,
wherein y ranges from 0.0025 to 0.4,
wherein z ranges from 0.0025 to 0.4, and
wherein the compound represented by the formula $Li_aMn_{1-x-y-z}Fe_xCo_yNi_zO_{2-d}Cl_d$ comprises iron, cobalt, and nickel.

9. The lithium electrochemical cell according to claim 8, wherein x+y+z ranges from 0.01 to 0.4.

10. The lithium electrochemical cell according to claim 8, wherein a reversible region for a $Li/Li_aMn_{1-x-y-z}Fe_xCo_yNi_zO_{2-d}Cl_d$ electrochemical couple ranges from 5.3 V to 2.0 V.

11. The lithium electrochemical cell according to claim 8, wherein x+y+z ranges from 0.0075 to 0.45.

12. The lithium electrochemical cell according to claim 11, wherein y ranges from 0.0025 to 0.35.

13. The lithium electrochemical cell according to claim 12, wherein z ranges from 0.0025 to 0.35.

14. A method of preparing a homogeneously dispersed cathode material, the method comprising:
mixing a manganese source, at least two Group VIII Period 4 element sources, and a liquid to form a solution;
forming a gel from the solution;
heating the gel to form a solid; and
calcining the solid to produce the homogeneously dispersed cathode material,
wherein the at least two Group VIII Period 4 element sources comprise an iron source, a cobalt source, and a nickel source,
wherein the iron source is selected from a group consisting of iron nitrate and iron acetate,
wherein the cobalt source is selected from a group consisting of cobalt nitrate and cobalt acetate,
wherein the nickel source is selected from a group consisting of nickel nitrate and nickel acetate,
wherein the homogeneously dispersed cathode material comprises a compound represented by the formula $Li_aMn_{1-x-y-z}Fe_xCo_yNi_zO_{2-d}Cl_d$,
wherein the compound represented by the formula $Li_aMn_{1-x-y-z}Fe_xCo_yNi_zO_{2-d}Cl_d$ comprises iron, cobalt and nickel,
wherein a ranges from 0.025 to 0.975,
wherein d ranges from 0.001 to 0.125,
wherein x ranges from 0.0025 to 0.4,
wherein y ranges from 0.0025 to 0.4, and
wherein z ranges from 0.0025 to 0.4.

15. The method according to claim 14, wherein x+y+z ranges from 0.0075 to 0.45.

16. The method according to claim 14, wherein x+y+z ranges from 0.01 to 0.4.

17. The method according to claim 14,
wherein the mixing step comprises mixing the manganese source, the iron source, the cobalt source, the nickel source, and the liquid to form the solution,
wherein x ranges from 0.0025 to 0.35,
wherein y ranges from 0.0025 to 0.35, and
wherein z ranges from 0.0025 to 0.35.

18. The method according to claim 14, further comprising:
mixing a chlorine containing salt and lithium nitrate with the solution to form a second solution;
mixing a chelating agent with the second solution to form a third solution; and
heating the third solution to form the gel,
wherein the calcining step is performed at a temperature ranging from 350° C. to 800° C. for a period of time ranging from 1 to 4 hours,
wherein the liquid is water,
wherein the chlorine containing salt is selected from a group consisting of lithium chloride, manganese chloride, iron chloride, cobalt chloride, and nickel chloride,
wherein the manganese source is manganese nitrate,
wherein the iron source is iron nitrate,
wherein the cobalt source is cobalt nitrate, and
wherein the nickel source is nickel nitrate.

19. The method according to claim 14, further comprising:
mixing a chlorine containing salt and lithium nitrate with the solution to form a second solution;
mixing a chelating agent with the second solution to form a third solution;
mixing a transesterification agent with the third solution to form a fourth solution; and
heating the fourth solution to form the gel,
wherein the solid is calcined at a temperature ranging from 350° C. to 800° C. for a period of time ranging from 1 to 12 hours,
wherein the chlorine containing salt is selected from a group consisting of lithium chloride, manganese chloride, iron chloride, cobalt chloride, and nickel chloride,
wherein the liquid is an alcohol,
wherein the transesterification agent is selected from a group consisting of ethylene glycol, trimethylene glycol, and tetraethylene glycol,
wherein the manganese source is manganese nitrate,
wherein the iron source is iron nitrate,
wherein the cobalt source is cobalt nitrate, and
wherein the nickel source is nickel nitrate.

20. The method according to claim 14, further comprising:
mixing ammonium hydroxide with the solution to form the gel;
mixing a mixed metal oxide with a first lithium source and with a second lithium source to produce a mixture; and
calcining the mixture at a temperature ranging from 400° C. to 1200° C. for a period of time ranging from 4 to 96 hours to produce the homogeneously dispersed Group VIII Period 4 element "metal" site and chlorine "oxygen" site modified lithium manganese based $Li_aMn_{1-x-y-z}Fe_xCo_yNi_zO_{2-d}Cl_d$ cathode material,
wherein the calcining step for the solid is performed at a temperature ranging from 250° C. to 600° C. for a period of time ranging from 1 to 8 hours to produce the mixed metal oxide, wherein the manganese source is manganese acetate,
wherein the first lithium source is selected from a group consisting of lithium perchlorate, lithium chloride, and lithium trichloroacetate,
wherein the second lithium source is selected from a group consisting of lithium carbonate, lithium hydroxide, lithium oxide, and lithium peroxide,
wherein the iron source is iron acetate,
wherein the cobalt source is cobalt acetate,
wherein the nickel source is nickel acetate, and
wherein the liquid is water.

* * * * *